United States Patent [19]

Foster

[11] Patent Number: 5,634,034

[45] Date of Patent: May 27, 1997

[54] ENHANCED PROCESSOR BUFFERED INTERFACE FOR MULTIPROCESS SYSTEMS

[75] Inventor: David J. Foster, White Plains, N.Y.

[73] Assignee: International Business Machines Corporation, Armonk, N.Y.

[21] Appl. No.: 456,776

[22] Filed: Jun. 1, 1995

Related U.S. Application Data

[62] Division of Ser. No. 917,246, Jul. 17, 1992, Pat. No. 5,485,594.

[51] Int. Cl.$^6$ .................................. G06F 12/00
[52] U.S. Cl. ................. 395/474; 395/401; 395/427; 395/309; 395/412; 395/512; 395/520
[58] Field of Search ................. 395/401, 410, 395/412, 427, 474, 309, 310, 162–166; 364/245.7, 251.7, 259.9

[56] References Cited

U.S. PATENT DOCUMENTS

| | | | |
|---|---|---|---|
| 4,065,862 | 1/1978 | Meyer | 395/550 |
| 4,121,283 | 10/1978 | Walker | 345/119 |
| 4,153,941 | 5/1979 | Caddell . | |
| 4,366,540 | 12/1982 | Berglund et al. . | |
| 4,458,308 | 7/1984 | Holtey et al. . | |
| 4,663,728 | 5/1987 | Weatherford et al. | 395/425 |
| 4,742,474 | 5/1988 | Knierim | 395/165 |
| 4,821,229 | 4/1989 | Jauregui . | |
| 4,835,681 | 5/1989 | Culley . | |
| 4,888,741 | 12/1989 | Malinowski | 365/230.05 |
| 4,928,224 | 5/1990 | Zulian | 395/309 |
| 4,956,804 | 9/1990 | Matsumoto . | |
| 4,958,309 | 9/1990 | Turkal . | |
| 4,981,296 | 1/1991 | Shiraishi et al. . | |
| 4,991,170 | 2/1991 | Kem | 370/85.1 |
| 5,068,781 | 11/1991 | Gillett, Jr. et al. | 395/325 |
| 5,261,059 | 11/1993 | Hedberg et al. | 395/312 |
| 5,276,684 | 1/1994 | Pearson | 370/94.1 |
| 5,280,591 | 1/1994 | Garcia et al. | 395/325 |
| 5,327,570 | 7/1994 | Foster et al. | 395/800 |
| 5,410,654 | 4/1995 | Foster et al. | 395/474 |

FOREIGN PATENT DOCUMENTS

| | | |
|---|---|---|
| 0339224A2 | 11/1989 | European Pat. Off. . |
| 0428149A2 | 5/1991 | European Pat. Off. . |
| 0526930A1 | 2/1993 | European Pat. Off. . |
| 2233480 | 1/1991 | United Kingdom . |

OTHER PUBLICATIONS

European Search Report dated Nov. 24, 1993.

*Primary Examiner*—Kee M. Tung
*Attorney, Agent, or Firm*—Perman & Green

[57] ABSTRACT

An Enhanced Processor Buffered Interface (22c) for use in a multiprocessor system (10). The Enhanced Processor Buffered Interface executes an Atomic Fetch and Add operation for maintaining multiprocessor consistency and for minimizing the required participation of an attached processor (22a) in reading and writing locked memory locations, supports interleaved memory banks (22d) that operate with burst mode memory accesses at rates of up to 400 MBytes/sec, includes switchable state machines (52, 54, 100) to selectively provide wait-states as required for supporting different memory access timings, and furthermore provides an improved serial interface to an external multi-element LED display (110).

3 Claims, 12 Drawing Sheets

MEMORY WRITE TIMING

MEMORY READ TIMING

ENHANCED PROCESSOR BUFFERED INTERFACE FOR MULTIPROCESS SYSTEMS

This is a divisional of application Ser. No. 07/917,246 filed on Jul. 17, 1992 now U.S. Pat. No. 5,485,594.

CROSS REFERENCE TO RELATED PATENT APPLICATIONS

This patent application is related to the following commonly assigned U.S. patent applications, all of which were filed on Jul. 22, 1991: Ser. No. 07/733,517, entitled "A Processor Buffered Interface for Multiprocessor Systems", D. Foster et al., now U.S. Pat. No. 5,410,654; Ser. No. 07/734,432, entitled "Scientific Visualization System", D. Foster et al., now U.S. Pat. No. 5,327,510; Ser. No. 07/734,206, (abandoned in favor of Ser. No. 08/260,107), entitled "A Universal Buffered Interface for Coupling Multiple Processors, Memory Units, and I/O Interface to a Common High-Speed Interconnect" A. Garcia; Ser. No. 07/733,563, entitled "A Centralized Backplane Bus Arbiter for Multiprocessor Systems" A. Garcia et al., now U.S. Pat. No. 5,280,591; Ser. No. 07/734,359, entitled "High Performance I/O Processor", R. Pearson, now U.S. Pat. No. 5,276,684; and Ser. No. 07/733,767 (allowed), entitled "A Serial Diagnostic Interface Bus for Multiprocessor Systems", D. Foster et al.

FIELD OF THE INVENTION

This invention relates generally to multiprocessor data processing systems and, in particular, to methods and apparatus for interfacing each of the processors to system resources, including shared memory.

BACKGROUND OF THE INVENTION

System requirements needed to interact with and visualize or display large, time-dependent data sets include a large, high-bandwidth disk array to store the entire data set being processed, a high speed network to download a problem set, a large, high-speed memory to buffer all data required to process a single simulation time step, computational power that is adequate to manipulate, enhance, and visualize the data sets, and a real-time, high resolution visual display. Furthermore, it is important that these functions be provided within a highly programmable and flexible user environment.

To realize such large and complex systems a multiprocessor approach may be taken, wherein a plurality of data processors operate in parallel on the same aspect or on different aspects of the same task.

An important consideration in a multiprocessor system is the interfacing of each of the processors to common, or shared, system resources and also to local, or private, processor resources. As an example, it may be required to interface each processor to a global bus having a shared (global) system memory coupled thereto, while also coupling each processor to a private, local memory.

In the above-mentioned U.S. patent application Ser. No. 07/733,517, entitled "A Processor Buffered Interface for Multiprocessor Systems", by D. Foster et al., now U.S. Pat. No. 5,410,654 there is disclosed a Processor Buffered Interface (PBIF) that performs a number of functions. These functions include: providing a local memory interface by providing control and address generation for up to 32 Megabytes (MBytes) of local memory; providing a global memory interface by providing 256-bit wide read and write buffers to cache global memory operations; and providing interrupt control for up to eight external or eight internal interrupts. Additional functions provided by the PBIF include providing DMA functions, miscellaneous functions, such as timer/counters, and providing a serial diagnostic bus interface. The PBIF includes state machines for controlling the timing and sequence of operation of many functions, including memory accesses and an interface to LED indicators.

The PBIF timing and operation is optimized to support a microprocessor type known as an i860XR(N10) that is manufactured by Intel Corporation. In order to implement memory Fetch and Add type memory operations, such as those employed for implementing semaphore operations, a locked read is performed, followed by a data return from the shared memory. The data return operation locks the addressed memory location to prevent access by another processor. The returned data is modified by the processor by providing the identification of the processor, and the modified data is written back to the shared memory using a locked write cycle. The completion of the locked write cycle unlocks the addressed location, thereby providing access to other processors. Typically, the contents of the location denotes the current ownership of a shared system resource.

However, the processor overhead attached to this protocol could be significant when, for example, all 32 processors are trying to obtain a lock on a single shared element in memory. That is, each of the processors must first read the location to determine if it is already locked, wait until the location is free (unlocked), issue a lock request, determine if the lock request is granted, and then proceed to modify the data.

Furthermore, although the PBIF is well suited for its intended application, if it is desired to upgrade the local microprocessor to device that is capable of receiving data at higher rate, i.e. on every clock cycle as opposed to every other clock cycle, then it is desirable to provide enhancements to the PBIF, and corresponding enhancements to the local memory and memory interface circuitry, so as to fully exploit the additional capabilities and speed of the upgraded microprocessor.

It is thus an object of this invention to provide an enhanced Processor Buffered Interface for use in a multiprocessor system.

It is another object of this invention to provide an enhanced Processor Buffered Interface that executes an Atomic Fetch and Add operation for maintaining multiprocessor consistency and for minimizing the required participation of the processor in reading and writing locked memory locations.

Another object of this invention is to provide an enhanced Processor Buffered Interface that supports interleaved memory banks that operate with burst mode memory accesses at rates of up to 400 MBytes/sec.

It is further object of this invention to provide an enhanced Processor Buffered Interface that includes switchable state machines to selectively provide wait-states as required for supporting different memory access timings.

It is one further object of this invention to provide an enhanced Processor Buffered Interface that provides an improved LED state machine operation so as to minimize a required amount of processor intervention.

SUMMARY OF THE INVENTION

The foregoing objects of the invention are realized by an interface unit that couples a processor of a multiprocessor system to other system components, including a local, private memory and also a global, shared memory.

An aspect of this invention provides a method, and apparatus for accomplishing the method, for executing a locked memory read/write cycle with a first data processor. The method includes the steps of (A) storing, within a first register, a value to be written to a memory; and (B) storing, within a second register, an address of a location within the memory wherein the value is to be stored Responsive to the step of storing an address, (C) initiating, over a bus that is coupled to the memory, a locked read cycle to a location within the memory that is specified by the address stored within the first register; (D) receiving the content of the addressed location from the memory; (E) storing the received content within a third register; (F) combining the content of the second register with the received content of the addressed location to produce a combined value; and (G) initiating a locked write cycle to the location within the memory that is specified by the address stored within the first register for storing the combined value into the location.

The step of receiving includes a step of locking the location within the memory against an access by a second data processor; and the step of initiating a locked write cycle includes a step of unlocking the location within the memory.

The step of initiating a locked read cycle includes the initial steps of generating a hold request signal to the first data processor; and receiving a hold acknowledge signal from the first data processor. The receipt of the hold acknowledge signal indicates that the first data processor has relinquished control of the bus that is coupled to the memory.

The method further includes the steps of (H) reading, with the data processor, the content of the third register means; (I) determining if the content of the third register indicates that the location has previously been written by a second data processor; and, if it is so indicated, executing steps (A) through (G) to restore to the location the content of the third register.

This method reduces the required processor overhead, and also provides significantly less latency to obtain a lock when several processors are each contending for the locked location.

A further aspect of the invention provides an interface for a data processor, the interface having programmable wait states for accessing devices external to the interface. The interface includes a control register having bits that are settable by the data processor. The interface further includes a first memory interface that is responsive to a state of at least one of the bits of the control register for selectively inserting or not inserting one or more wait timing states while providing address signal lines and control lines to a first memory system. The interface further includes a second memory interface that is responsive to a state of at least one of the bits of the control register for selectively inserting or not inserting one or more wait timing states while providing address signal lines and control lines to a second memory system. The first memory system is a private, local processor memory system having interleaved memory banks for achieving a high bandwidth, and the second memory system is a shared, global memory that is accessible over a system bus.

One further aspect of the invention provides interface apparatus having an improved interface to an externally provided multi-element LED display. A state machine loads the LED display in a bit serial manner without requiring processor intervention, other than to initially store a desired display content within a register within the interface apparatus.

BRIEF DESCRIPTION OF THE DRAWING

The above set forth and other features of the invention are made more apparent in the ensuing Detailed Description of the Invention when read in conjunction with the attached Drawing, wherein:

FIG. 13 illustrates the use of selectively switchable wait states to accommodate various state machine timing requirements;

DETAILED DESCRIPTION OF THE INVENTION

Figure 1:
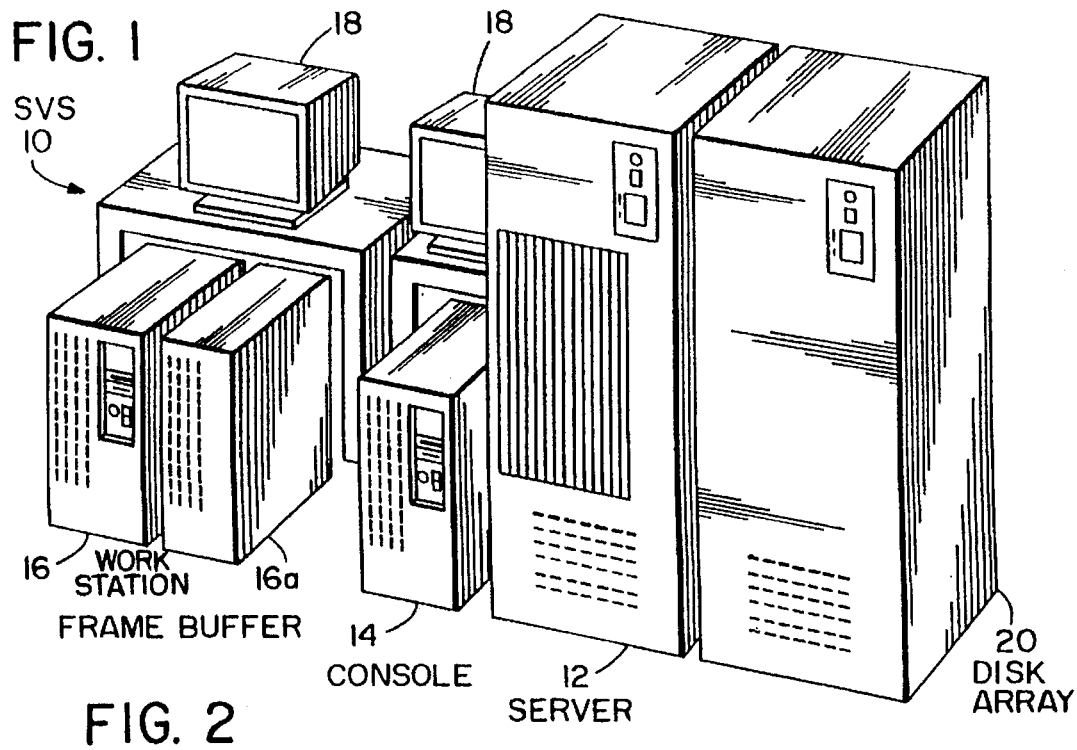
FIG. 1 illustrates system components of a scientific visualization system.

Referring to FIG. 1 there is illustrated a multiprocessor system that includes an enhanced processor buffered interface (EPBIF) that is constructed and operated in accordance with the invention. Specifically, there are illustrated components of a Scientific Visualization System (SVS) 10. A purpose of the SVS 10 is to process, manipulate, and visualize complex data sets at interactive speeds, although the use of the system 10 is not limited to only this one important application. Furthermore, and as will become apparent, the use of the EPBIF of the invention is not restricted to only this particular system. That is, the EPBIF as taught by the invention may be employed to advantage in a number of different types of multiprocessor systems.

The SVS 10 includes several major components. A first component is a server 12 embodied within a data processing system that provides large-scale computational power, high-speed memory, and intelligent I/O processors, all of which are interconnected by a high speed global bus. The terms global bus, shared bus, and common interconnect are used interchangeably herein.

A second component is a console processor 14 embodied in, by example, a RISC System/6000 (RS/6000) workstation manufactured by the International Business Machines Corporation (RISC System/6000 is a Trademark of the International Business Machines Corporation). The console 14 provides network access from remote workstations (not shown).

A third component is a Frame buffer 16 that includes, by example, an RS/6000 workstation that provides console functions therefor. The frame buffer 16 includes interface and image buffering hardware 16a attached via an ANSI standard High Performance Parallel Interface (HIPPI) interface for providing real-time display capability to high-resolution displays 18. A further component of the system 10 is a disk array 20. The disk array 20 may be embodied within a storage system having 21 GByte capacity with 55 MByte/second transfer rate via a HIPPI interface.

It should be realized that the exact configuration of the system 10 varies depending on the intended use, and that the configuration of FIG. 1 is not intended to represent a limitation upon the practice of the invention.

Figure 2:
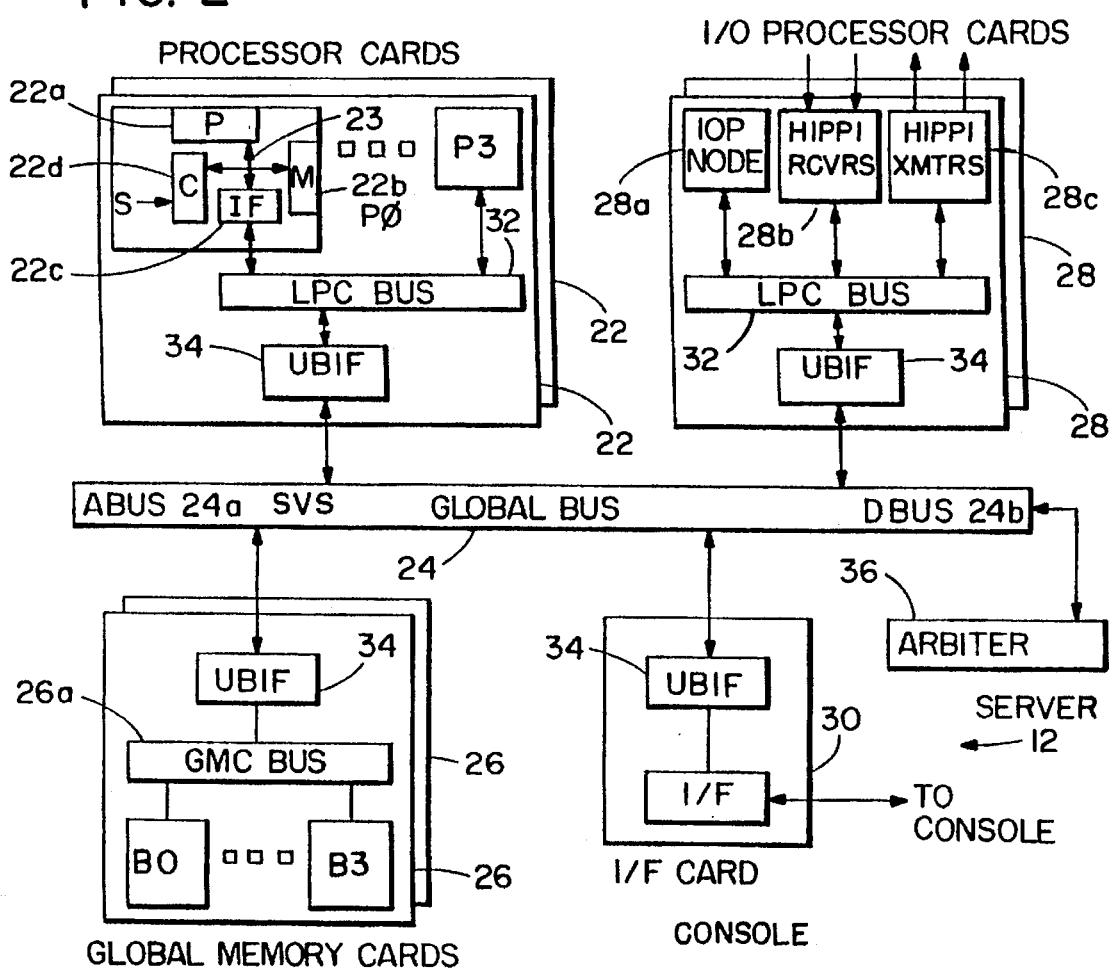
FIG. 2 is a block diagram of the system server component of FIG. 1.

Referring to FIG. 2 there is illustrated in block diagram form the server 12 of the SVS 10. Server 12 is comprised of a plurality of individual processors 22a organized as four processors (P0–P2) per printed circuit card 22. The server 12 may include up to eight cards for a total of 32 processors. Each processor card 22 includes a universal bus interface (UBIF) 34 for coupling a Local Processor Card (LPC) bus 32 to an SVS global bus 24. Also coupled to the SVS global bus 24 are a plurality of Global Memory cards 26, a plurality of I/O processor cards 28, an interface 30 to the RS/6000 console 14, shown in FIG. 1, and a backplane arbiter 36.

In a present embodiment of the SVS 10 each of the Global Memory cards 26 is configured with either 128 MB or 256 MB of random access memory with error correction logic. The server 12 may include up to four Global Memory cards 26. Each of the Global Memory cards 26 provides a data bandwidth of 640 MB/second in a manner that reduces a memory access latency seen by each processor 22a in the system 10. This is accomplished by partitioning the Global Memory on each memory card 26 into four memory banks (B0–B3), each of which is capable of independently performing block read cycles, page mode read or write cycles and random read or write cycles. A Global Memory Card (GMC) bus 26a enables each of the banks (B0–B3) to operate independently, while utilizing common global bus resources.

The I/O processor cards 28 each include a processor node 28a, similar to the processor card 22, plus two HIPPI receivers 28b, and two HIPPI transmitters 28C. Each IOP 28 provides four HIPPI interfaces, each of which is capable of operation at a transfer rate of 100 MB/second. Each IOP 28 includes a dedicated processor node 28a, such as is found on the processor card 22, having a microprocessor coupled to 16 MB of local memory. Two receiver channels 28b and two transmitter channels 28c are provided on each IOP 28. The channels operate independently to deliver 100 Mbytes/second each. The HIPPI interfaces are employed to support high speed disk arrays, provide real-time images to HIPPI-attached frame buffers, and realize high speed communication with external devices, such as supercomputers.

The Console interface 30 is partitioned into two cards, one which is found within the server 12 and one which resides in the console 14. The link between the two card allows access to the SVS server global memory and serial bus, which in turn allows access to each processor's local memory and EPBIF.

The system 10 also includes the Arbiter 36 that is coupled to the Global Bus 24 and which operates to arbitrate requests for the Global Bus between the processors 22, the memory 26, console interface 30, and the I/O processors 28.

The Global Bus 24 is implemented with Emitter Coupled Logic (ECL) technology for interconnecting these various components and providing a 1280 MB/sec transfer rate with synchronous transfers. Major signal groups of the Global Bus 24 include a 32-bit address bus (ABUS) 24a, a 256-bit data bus (DBUS) 24b, and a control bus.

Figure 3:
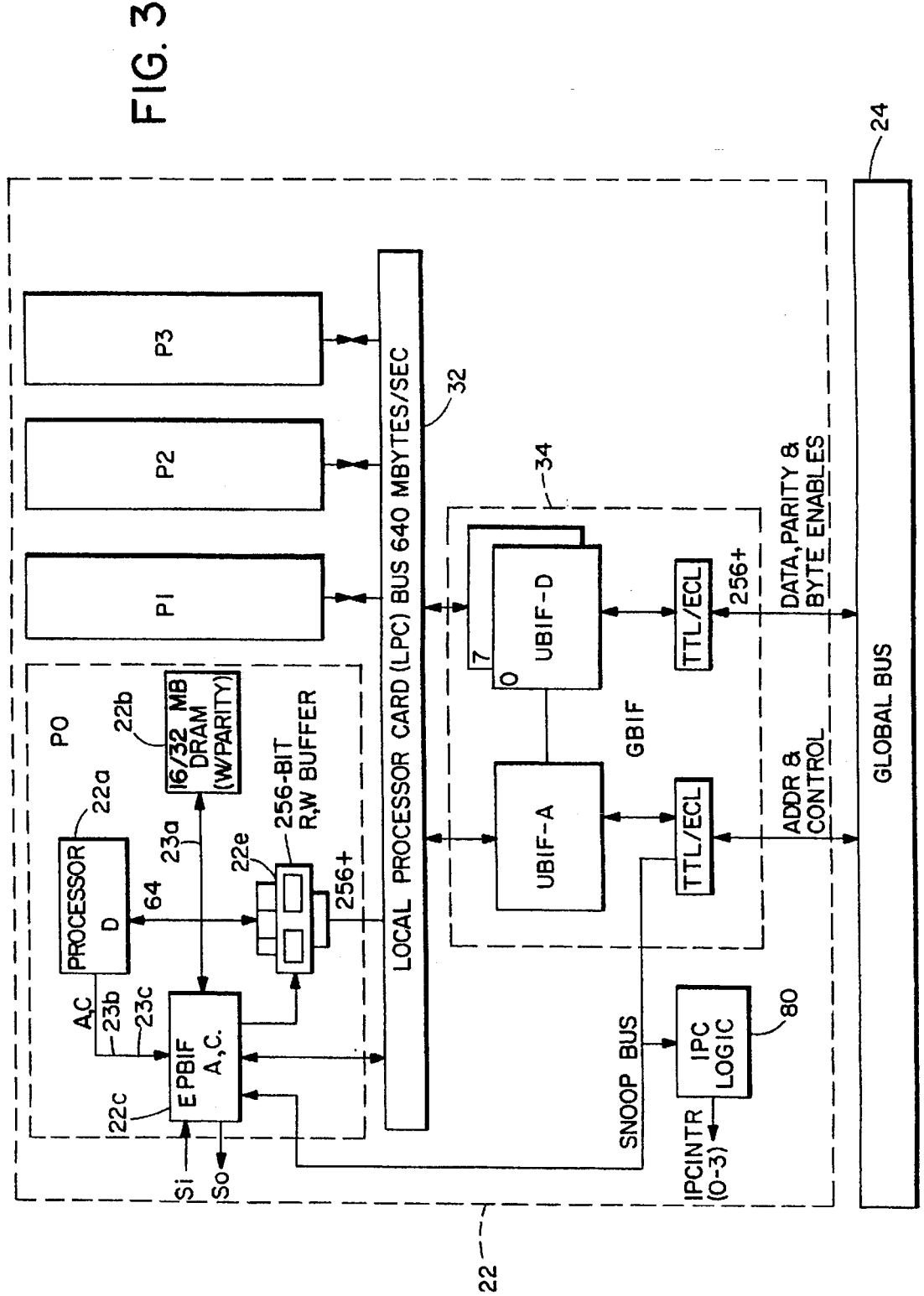
FIG. 3 is a block diagram showing in greater detail a card containing four processor nodes.

As can be seen in FIGS. 2 and 3 each component card of the system 10 includes one of the UBIFs 34. The UBIF 34 presents a shared, synchronous, decoupled interface to the Global Bus 24, provides local arbitration on the LPC bus 32 or GMC bus 26a, and performs all necessary handshaking and retry sequencing with the Global bus 24. In a present embodiment the UBIF 34 provides bidirectional, pipelined buffering to support up to four local master devices, such as processors 22a, or up to four slave devices, such as the memory banks B1–B4. The UBIF 34 supports data bus widths between eight bits and 256 bits and provides a peak data transfer rate of 1280 MB/second between the Local Bus 32 and the Global Bus 24, assuming 40 MHz bus operation (25 nanosecond bus cycle).

As seen in the block diagram of FIG. 3, each processor card 22 includes up to four processor nodes, each having a microprocessor 22a. In a present embodiment each microprocessor 22a is an i860-type device, specifically an i860XP (N11) microprocessor device manufactured by Intel Corporation (i860 is a Trademark of the Intel Corporation). Coupled to each microprocessor 22a through a local node bus 23, comprised of a local node data bus 23a, a local node address bus 23b, and a local node control bus 23c, is a local node memory 22b providing 16 MBytes or 32 MBytes of storage. The local memory is organized into two interleaved memory banks (BANK A and BANK B) for maximizing the data transfer rate to and from the local node data bus 23a and, hence, the processor 22a. Each processor node also includes, in accordance with the invention, an EPBIF 22c, which incorporates an interface to the LPC bus 32. Additionally, each processor node includes an interface 22d (seen in FIG. 2) to a serial bus (S). The LPC bus 32 connects multiple processor nodes to the UBIF 34 and also permits access to further shared resources.

Figure 6:
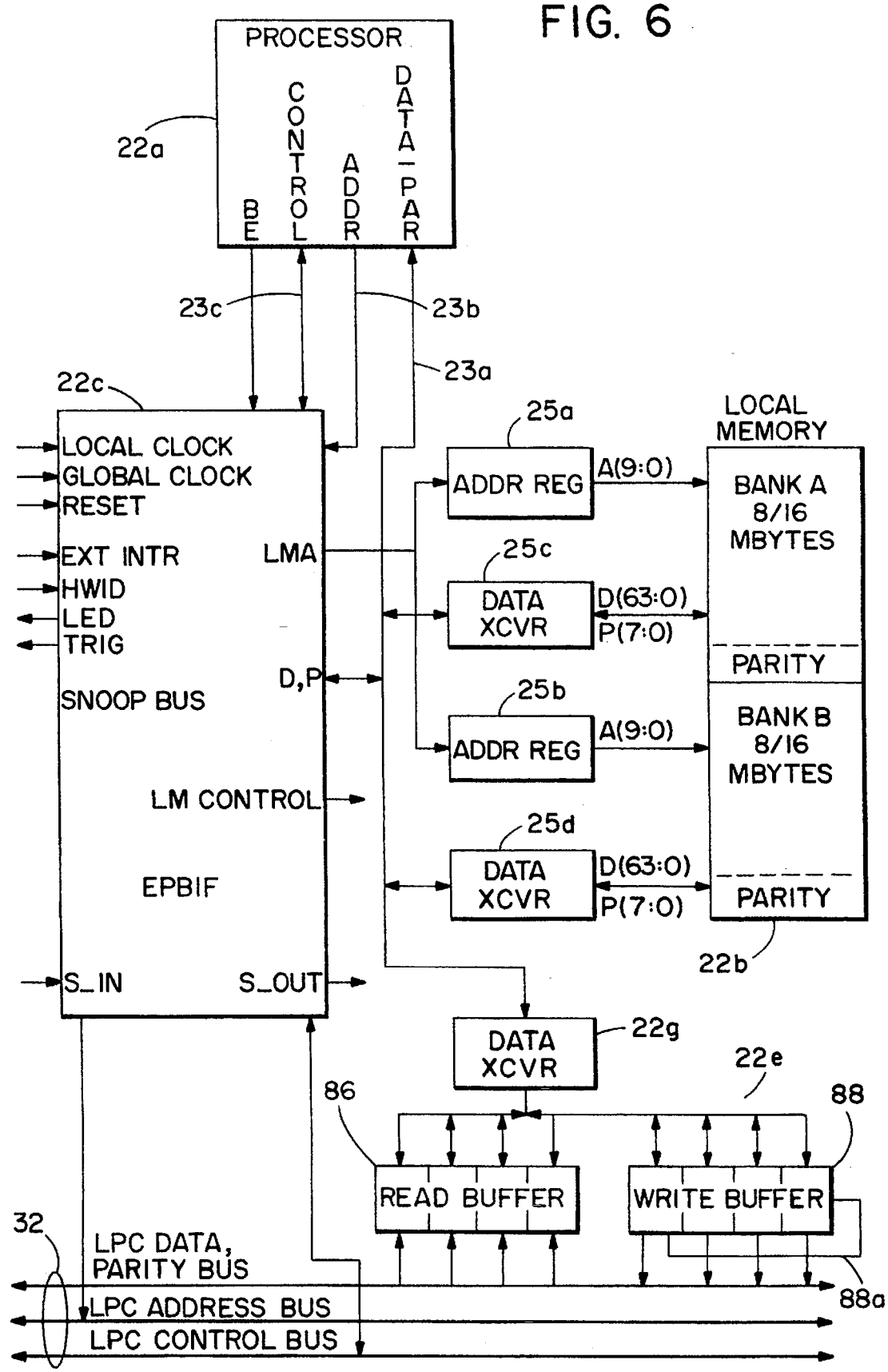
FIG. 6 is a block diagram showing a local processor node and the interconnectivity of the local processor, the enhanced processor buffered interface, a local, private memory, and a global memory interface.

FIG. 6 shows in greater detail the interconnection, within a local processor node, of the EPBIF 22c to the local processor 22a, the local memory 22b, the global memory interface 22e, and the LPC 32. As can be seen, the local memory 22b is partitioned into the two banks (BANK A and BANK B), each of which may include 8 MBytes or 16 MBytes of DRAM. Each memory bank also includes a parity memory section for storing associated memory parity information. Memory Bank A has an associated address register 25a and an associated registered data transceiver 25c. In like manner Memory Bank B has an associated address register 25b and an associated registered data transceiver 25d. Registers 25a, 25b and registered transceivers 25c, 25d are individually controlled by Local Memory (LM) controls output from a control 52a of the EPBIF 22c, as will be described below, and interface the Local Memory 22b to the multiplexed Local Memory Address (LMA) bus and to the local node 64-bit data bus 23a, respectively. A set of eight transceivers 22g bidirectionally couple the local node data bus 23a to a 256 bit read buffer 86 and to a 256 bit write buffer 88.

Figure 4A:
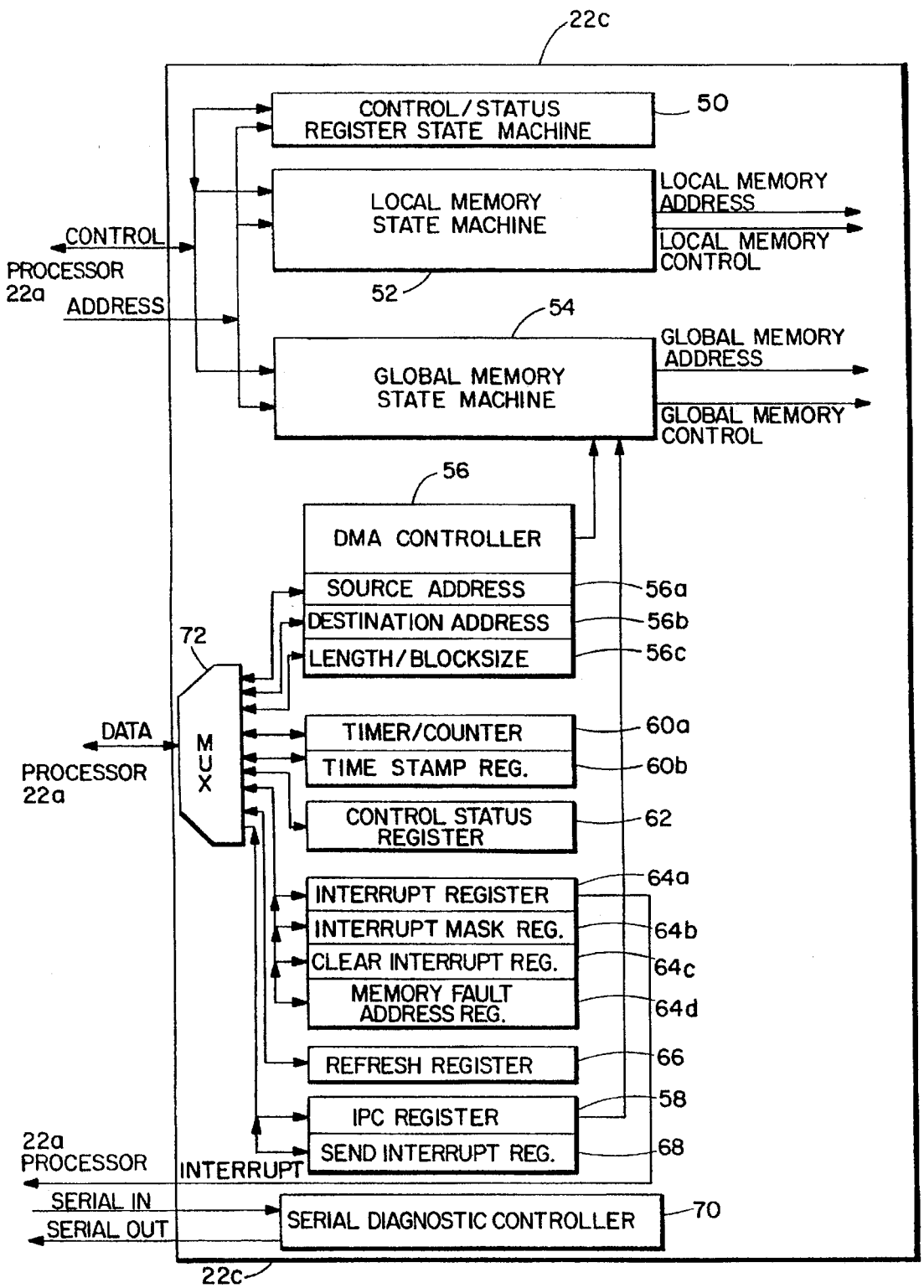
FIG. 4a is a simplified block diagram showing the registers and state machines of the enhanced processor buffered interface of the invention.
Figure 4B:
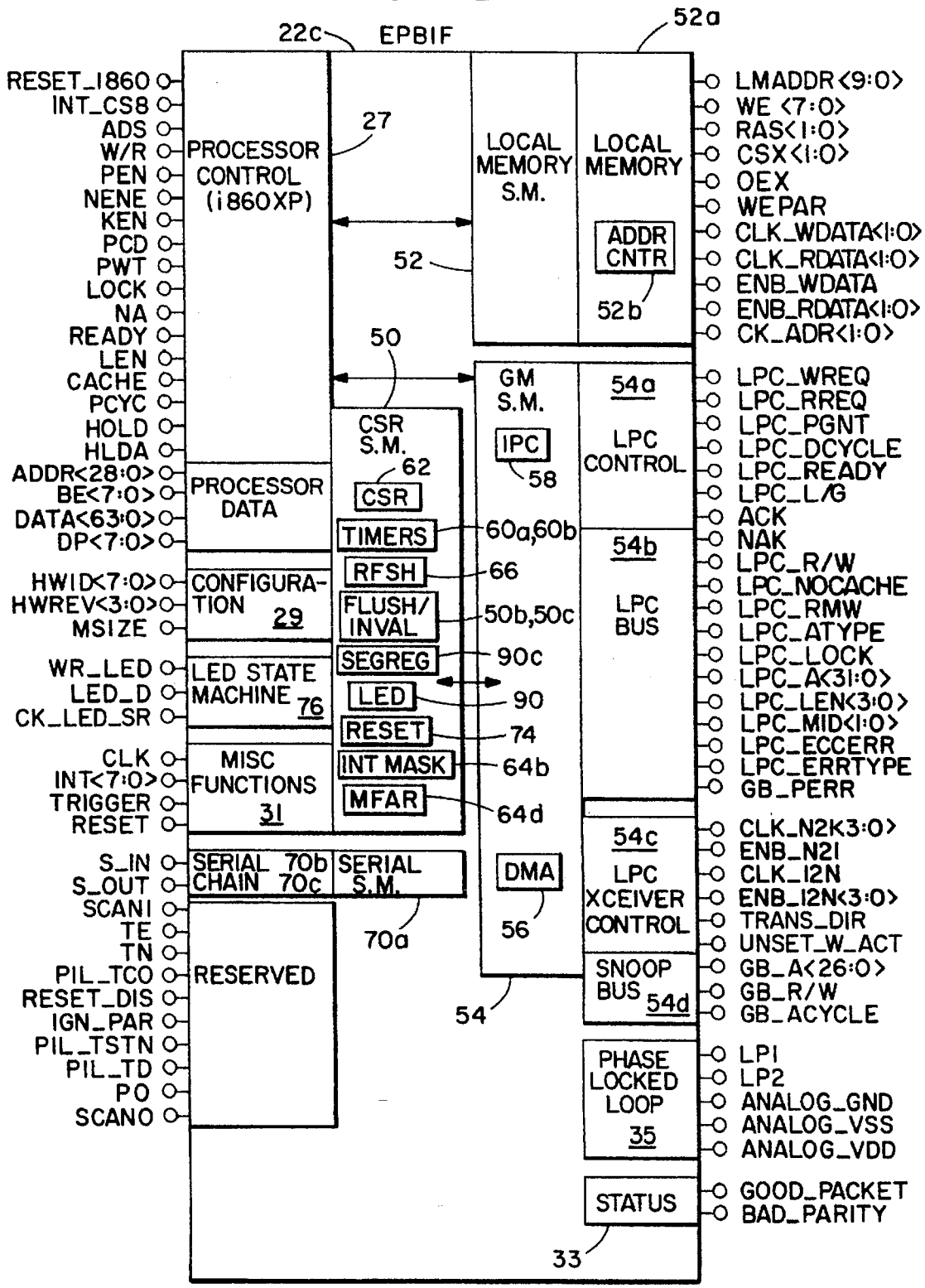
FIG. 4b is also a simplified block diagram showing the association of various state machines with their respective interfaces.

Referring to the block diagram of FIGS. 4a and 4b there is now described a presently preferred embodiment of the Enhanced Processor Buffered Interface (EPBIF) 22c. The EPBIF 22c functions as an interface and a control device for the associated computational processor 22a or I/O processor 28a. The EPBIF 22c provides all of the required logic, with the exception of tranceivers and memory, to interface a high performance microprocessor to a high performance multiprocessor system. Although the ensuing description is made primarily with respect to the computational processors 22a, it should be realized that the EPBIF 22c functions in an identical manner with each of the I/O processors 28a.

The EPBIF 22c architecture is implemented as a set of discrete data registers (e.g., 64a–64d) together with an Application Specific Integrated Circuit (ASIC). The EPBIF 22c provides the following functions to each processor in the SVS 10.

Local Memory 22b Interface: Each EPBIF 22c provides control and address generation for up to 32 MBytes of local memory 22b.

Global Memory 26 Interface: Each EPBIF 22c provides control signals to an external 256-bit wide read and write buffer 22e to cache Global Memory 26 operations.

Interrupt Control: Each EPBIF 22c provides support for up to eight externally generated interrupts and eight internally generated interrupts.

Inter-Processor Interrupt Capability: Each EPBIF 22c provides support for an inter-processor interrupt mechanism whereby a processor in the system can interrupt any other processor (or group of processors).

Direct Memory Access (DMA) Functions: Each EPBIF 22c provides a means of transferring data at high speed between the Global Memory 26 and the associated Local Memory 22b using direct memory access cycles.

Miscellaneous Functions: Each EPBIF 22c incorporates a Control and Status Register (CSR), two programmable timer/counters, logic to reset the associated processor 22a or 28a, and other functions, as will be described.

Serial Diagnostic Bus Interface: Each EPBIF 22c includes circuitry that works in concert with a serial diagnostic bus, as described in the above-mentioned commonly assigned and allowed U.S. patent application Ser. No. 07/733,767, filed Jul. 22, 1991, entitled "A Serial Diagnostic Interface Bus for Multiprocessor Systems", by A. Garcia et al.

EPBIF 22c includes a plurality of clocked, independent state machines, including a Control/Status Register (CSR) state machine 50, a local memory state machine 52, and a global memory state machine 54. These three state machines have inputs connected to the control and address signal lines of the attached processor 22a or 28a. In addition, the global memory state machine 54 receives an input from a DMA controller 56 and an interprocessor communication (IPC) register 58. The local memory state machine 52 generates local memory address and control signal lines that are coupled to the local memory 22b via an interface 52a for controlling accesses thereto. The global memory state machine 54 generates global memory address and control signal lines that are coupled via interfaces LPC Control 54a, LPC bus 54b, and LPC transceiver control 54c to the local processor bus 32, the UBIF 34 and hence to the global bus 24. The global memory state machine 54 generates global memory address and control signals in response to the local processor 22a or 28a, or in response to the operation of the DMA controller 56 or the IPC register 58.

Figure 5:
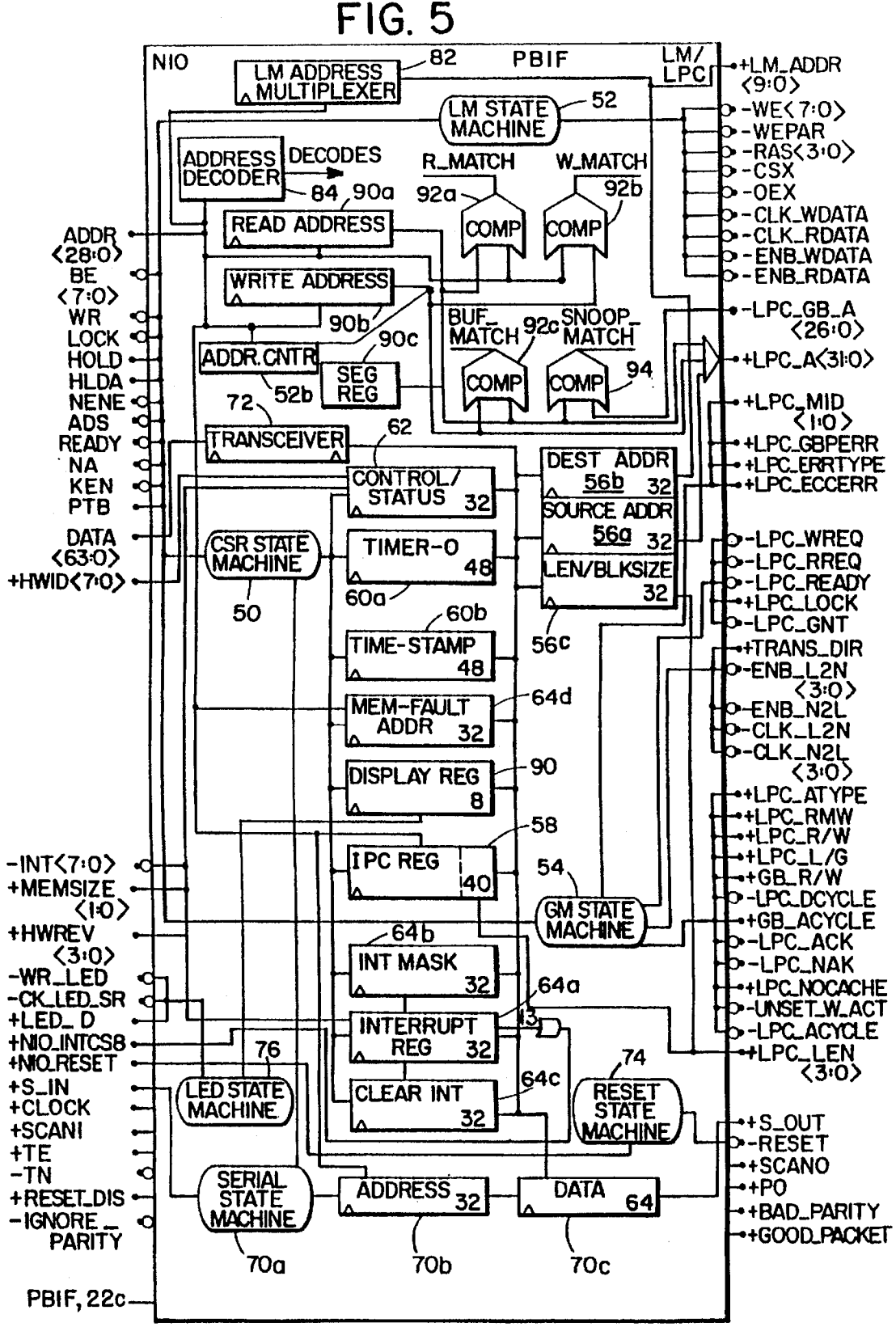
FIG. 5 is another block diagram of the enhanced processor buffered interface showing in greater detail the interconnectivity of the various registers, state machines, and external interfaces.

The block diagram of FIG. 5 also shows several other state machines including a reset state machine 74 and a LED state machine 76. The serial diagnostic controller 70 can be seen to include a serial state machine 70a, an address register 70b and a data register 70c all of which are connected in series and have an output connected to a serial out signal line that is threaded through each of the EPBIFs within the system 10.

The reset state machine 74 ensures that the processor 22a is held in reset until all registers in the EPBIF 22c are correctly initialized after, by example, power on. These registers may be initially loaded via the Serial Diagnostics Interface bus from a system console (Host 14).

The DMA controller 56 includes a source address register 56a, a destination address register 56b, and a length/blocksize register 56c. These registers are loaded by the attached processor for controlling DMA operations. The source address register 56a is initially loaded with the memory address from which data is to be read, the destination address register 56b is initially loaded with the address to which the data is to be stored, and the length/blocksize register 56c is initially loaded with a value representing a number of data units that are to be transferred during a DMA operation.

The CSR SM 50 includes a control status register (CSR) 62, the operation of which is described in further detail below, a timer/counter register 60a, and a block of interrupt-related registers. These include an interrupt register 64a, an interrupt mask register 64b, a clear interrupt register 64c, and a memory fault address register (MFAR) 64d. A refresh register 66 is provided for controlling the refresh timing parameters for the local memory 22b DRAMs.

The aforementioned registers are bidirectionally coupled to the local processor 22a through a data multiplexer 72 such that the local processor 22a is enabled to store information within and read information from these registers.

Before describing the EPBIF 22c in greater detail, there is first described the functions of the interface signals pins shown in FIGS. 4a and 4b. Each signal name is defined as an input (--I), output (--O), or bidirectional signal (---I/O). The signal names appear below in the same order as in FIG. 4b, reading from the top left going down and then from the bottom right going up.

The following signals are specific to the i860XP processor 22a and are driven and received by a Processor Control logic block 27 of the EPBIF 22c. Further details regarding the timing and other characteristics of these signals can be found in the specification for the i860 processor family.

+RESET__i860 --O. The reset pin for the processor 22a; driven by the reset state machine 74 and active when high (+).

+INT__CS8 --O. This is the single interrupt input to the processor 22a, which also serves to select between an 8-bit and a 64-bit mode at processor 22a initialization.

−ADS −I. This signal indicates the start of a processor 22a memory cycle, and is active when low (−).

W/R --I. The processor 22a read (--)/write (+) signal line.

-PEN --O. The processor 22a parity enable pin, when active on reads the processor 22a will check for correct read data parity.

-NENE --I. The processor 22a next/near pin, which is active when the current memory operation is to the same page of memory as the preceding memory operation.

-KEN --O. Indicates to the processor 22a whether the currently returned read is cacheable.

+PCD --I. Page cache disable line from the processor 22a. This signal line provides cache information about a current memory access.

+PWT --I. Page write-through-line from the processor 22a. This signal line also provides cache information about a current access.

LOCK --I. The processor 22a lock pin. A low indicates a locked memory cycle.

-NA--O. Indicates that the processor 22a may drive another memory request onto its bus (even though preceding memory requests may not be complete). This takes advantage of the processor's ability to pipeline three outstanding requests.

-READY--O. Indicates to the processor 22a the completion (or posting) of a write, or that returning read data is valid on the bus. This is an output from the EPBIF 22c to the processor 22a.

+LEN --I. Length input from the processor 22a. This line active indicates a burst cycle of 128 bits from the processor 22a.

-CACHE --I. Cache input from processor 22a. This line active indicates a burst cycle of 256 bits from processor 22a (overrides LEN active).

+PCYC --I. This signal line indicates that the processor 22a is performing a page table operation.

+HOLD --O. The processor 22a hold signal line, the assertion of which causes the processor 22a to place its I/O pins in a high impedance state.

+HLDA --I. The processor 22a hold acknowledge signal line which, when active, indicates that the processor 22a is halted.

+ADDR(28:0) --I. 29 address signal lines from the processor 22a.

-BE(7:0) --I/O. Eight processor 22a byte enables which are active during processor write cycles. These are I/O to enable serial bus writes to the LPC bus.

DATA(63:0) --I/O. The 64-bit processor 22a data bus.

DP(7:0) -I/O. Processor 22a data parity bus.

The following signals are all inputs to a configuration logic block 29, and are reflected as well in the CSR 62, as described below, and are thus readable by the processor 22a.

+HWID(7:0) --I. An eight bit hardware processor node ID that is composed of signals Local Processor ID (LOC__PROCID), Slot ID (SLOTID), and Unit ID (UNITID).

+HWREV(3:0) --I. Indicates the hardware revision level of the processor card 22.

+MSIZE --I. Indicates to the local memory controller 52a the size of the local memory 22b (16 or 32 MBytes). This input is used to select a number of Row Address Strobe (RAS) lines to drive to the local memory 22b.

The following signals are connected to the LED state machine 76.

-WR_LED--O. This output of the EPBIF 22c writes (on the rising edge) the output of an external serial LED register into an external LED display (shown in FIG. 14).

+LED_D--O. Serial output data to the external LED shift register (shown in FIG. 14).

-CK_LED_SR--O. clocks the LED output data into the LED shift register.

The following four signals are connected to a miscellaneous functions logic block 31.

+CLOCK --I. Single phase clock input to the EPBIF 22c.

-INT(7:0) --I. External interrupt inputs to the EPBIF 22c.

+TRIGGER --0. Trigger output pin

-RESET --I. Reset input from the LPC bus to the EPBIF 22c.

The following two signals are connected to the serial chain interface (registers 70b and 70c) and the Serial SM 70a.

+S_IN--I. The serial diagnostic bus input.

+SOUT --O. The serial diagnostic bus output.

The following signal lines are all reserved for various EPBIF 22c manufacturing and testing operations:

+SCANI --I, -TE --I, -TN --I, +PLL_TCO--O, +RESET_DIS --I, -IGN_PARITY --I, +PLL_TSTN --I, +PLL_TD --I, +PO --O, and +SCANO --O.

A status logic block 33 outputs the following two signals.

+BAD_PARITY --O. Indicator from a status block 82 that a serial chain state machine 80 has received a serial data packet having bad parity.

+GOOD_PACKET --O. Indicates that the serial chain state machine 80 has received a serial data packet with good parity.

The following signals are employed by an on-chip phase locked loop 35.

+ANALOG_VDD --I, +ANALOG_VSS --I, +ANALOG_GND --I, +LP2 --O, and +LP1 --O.

The following three signals are connected to a snoop bus logic block 54d for monitoring the activity of the global bus 24.

+GB_ACYCLE --I. Indicates that there is a valid address cycle on the GB 24. This signal is used to qualify a snoop address match with a comparator 94 (FIG. 5).

+GB_R/W --I. Read/write line of the GB 24 which is employed for address snooping.

+GB_A(26:0) --I. The GB 24 snoop address formed from the 27 least significant address bits on the GB 24 (from 256-bit word address).

The following six signal lines are all connected to the LPC transceiver control 54c for controlling the transceiver 22g and registers 86, 88, and 88a.

-UNSET_W_ACT --O. Unset write buffer active. This signal is used to reset the LPC bus byte enables (register 88a) after an LPC bus write.

+TRANS_DIR --O. Direction line for processor 22a to LPC bus 32 data path buffers.

-ENB_L2N(3:0) --O. Enables one of the four 64-bit LPC read buffers 86 to the processor 22a.

-CLK_L2N --O. Clock enable to clock 256 bits of data from the LPC bus into the read data buffer 86.

-ENB_N2L --O. Enables 256 bits of data from the write buffer 88 onto the LPC bus 32.

-CLK_N2L(3:0) --O. Clock enable to clock data from the processor 22a data bus into one of the four write data buffers 88.

The following signal lines are connected to the LPC bus interface 54b or to the LPC Control interface 54a.

+GB_PERR --I. Reports bad parity returned on the GB 24.

+LPC_ERRTYPE --I. Returned ECC status from the global memory 26. A zero indicates a corrected single-bit error, while a one indicates an uncorrectable double bit error.

+LPC_ECCERR --I. Indicates an error on the global memory 26 data return path.

+LPC_MID(1:0) --I. Memory return ID field that identifies a destination identifier for the data return.

+LPC_LEN(3:0) --O. The LPC bus 32 length field. Normally driven low on global memory 26 reads, but conveys a real value when outputting an IPC interrupt cycle.

+LPC_A(31:0) --O. LPC bus 32 address bits.

+LPC_LOCK --O. LPC bus 32 lock line, where a high indicates a locked cycle.

+LPC_ATYPE --O. LPC bus 32 address type, where a high indicates a normal cycle and a low indicates an IPC interrupt cycle.

+LPC_RMW -O. Indicates on a write cycle whether all 32 byte enables are active (Read-Modify-Write cycle).

+LPC_NOCACHE --I. Indicates to the EPBIF 22c that the data being returned on the LPC bus 32 is non-cacheable.

+LPC_R/-W --O. LPC bus 32 read/write line, wherein a low indicates a write cycle.

-LPC_NAK --I. LPC bus 32 Not Acknowledge pin.

-LPC_ACK --I. LPC 32 bus Acknowledge pin.

+LPC_L/G --O. Indicates whether the current LPC bus cycle is destined for the UBIF 34 (low) or local memory 22b (high). This signal line is asserted by the EPBIF 22c.

-LPC_READY --O. LPC bus 32 ready line; indicates that the EPBIF 22c is ready to accept data.

-LPC_DCYCLE --I. Indicates that there is valid data being returned from the UBIF 34 on the LPC bus 32. This line is snooped by the EPBIF 32 when there exists an outstanding global memory 26 read request.

-LPC_PGNT --I. LPC bus 32 grant line.

-LPC_RREQ --O. LPC bus 32 read request.

-LPC$_{13}$ WREQ --O. LPC bus 32 write request.

The following signal lines are all connected to the Local Memory 22b interface 52a.

-CK_ADR(1:0) --O. Clock local memory address. These signals are clock enables for the local memory 22b external address registers 25a and 25b.

-ENB_RDATA(1:0) --O. Enables 64 bits of data from the local memory read buffers 25c and 25d to the processor 22a data bus 23a on a per memory bank basis.

-ENB_WDATA --O. Enables 64 bits of data from the local memory write buffers 25c and 25d to the local memory 22b.

-CLK_RDATA(1:0) --O. Clock enable to latch 64 bits of data from the local memory 32 into the local memory read buffers 25c and 25d on a per memory bank basis.

-CLK_WDATA(1:0) --O. Clock enable to latch 64 bits of data from the processor 22a data bus into the local memory write buffers 25c and 25d on a per memory bank basis. -WEPAR --O. Parity memory write enable line which is active if any of the eight local memory write enables (WE(7:0)) are active.

--OEX --O. Local memory output enable line (for reads).

-CSX(1:0) --O. Two local memory 22b chip select (CAS) lines, one per bank.

-RAS(1:0) --O. Two RAS lines for local memory 22b. One is used to enable each of the 16-MByte banks of memory. The number of RAS lines driven depends on the state of MEMSIZE input (described above).

-WE(7:0) --O. Eight local memory write enables, one per byte.

+LMAddr(9:0) --O. Ten local memory 22b multiplexed address bits that are latched by the address registers 25a and 25b.

Having described in detail the external interface of the EPBIF 22c, there is now described in greater detail the major functional blocks of the EPBIF 22c.

Local Memory

The local memory interface 52a provides both the address multiplexing for row and column addresses, and also the control signals required to interface to up to 32 MBytes of local memory 22b. In addition, the EPBIF 22b supports a processor 22a burst mode, wherein a single address cycle from the processor 22a requests up to four 64-bit data words to be either read or written. To support this feature an address counter 52b automatically generates correct memory addresses based on the starting address for the next three words of the burst (bursts of length two are also supported). Two fully independent interleaved banks of local memory 22b are supported. As a result, data can be read or written every clock cycle (20 ns) in the burst mode. As was described above, each memory bank has associated address and data registers (25), and unique control lines.

The local memory 22b interface 52a includes an address multiplexer 82 that provides both the address multiplexing for row and column addresses, and also the the local memory state machine 52 that generates control signals required to interface to up to 32 MBytes of local memory 22b. This capability is based on the number of multiplexed address lines (10) which this particular implementation of the EPBIF 22c generates. Other embodiments may provide access to more or less than 32 MBytes of local memory.

The EPBIF 22c also provides a programmable refresh rate for the local memory 22b. A refresh register 66 is written with a divisor that is applied to the system clock. The resulting divided clock is used to periodically generate refresh cycles. Any refresh request is queued until all currently executing memory cycles are complete. The pending refresh request then has priority over any new cycles requested by the processor 22a. Local memory 22b refresh occurs unhindered if the processor 22a is accessing another range in memory (such as Global Memory 26).

2. Global Memory Interface

The processor 22a includes an internal 8 KB data cache and a 4 KB instruction cache having cache lines that are 256-bits in width, and an external data bus that is 64 bits in width. The width of the internal cache line coincides with the width of the Global Data Bus (DBUS 24b), although the width of the processor 22a data bus 23a is a factor of four less than that of DBUS 24b. The two external 256-bit registers 86 and 88 provide data bus width matching, and also provide an external, one line, level two cache for the processor 22a.

When the processor 22a issues a read to a Global Memory 26 location, the address is decoded within the EPBIF 22c by address decode block 84 and the relevant request lines to the UBIF 34 (which controls the Global Bus 24) are generated. When granted a bus cycle by the UBIF 34, the EPBIF 22c drives the address onto the LPC bus 32, along with any necessary control lines. The EPBIF 22c then "snoops" the local bus 32, waiting for the Global Memory 26 data to be returned. A unique processor ID field, associated with the processor that made the read request, in conjunction with a data valid line on the local bus 32, define the data return condition. When data is returned to an identified processor from the Global Memory 26, the EPBIF 22c generates control signals to latch the returned data into the external read buffer 86, and then enables the appropriate word (64-bits) back to the identified processor 22a via the local node data bus 23a. If the processor 22a follows the first request with another request to a 64-bit word, which is also encached within the 256-bit read buffer 86, the second 64-bit word is returned to the processor 22a from the read buffer 86 with minimal latency, and without utilizing any bus bandwidth on either of the shared busses (LPC 32 and GB 24).

Figure 7:
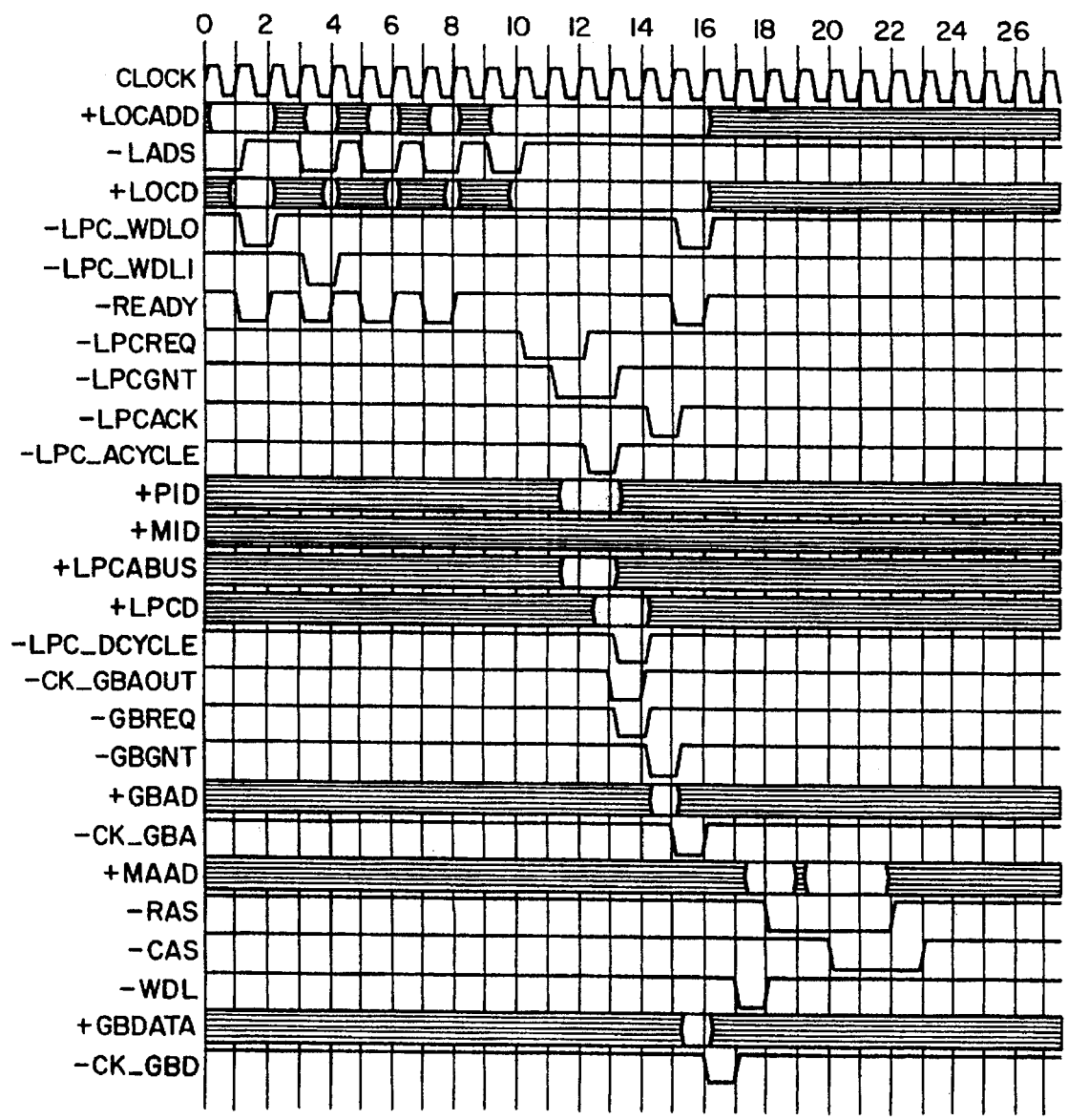
FIG. 7 is a timing diagram illustrating global memory write timing.
Figure 8:
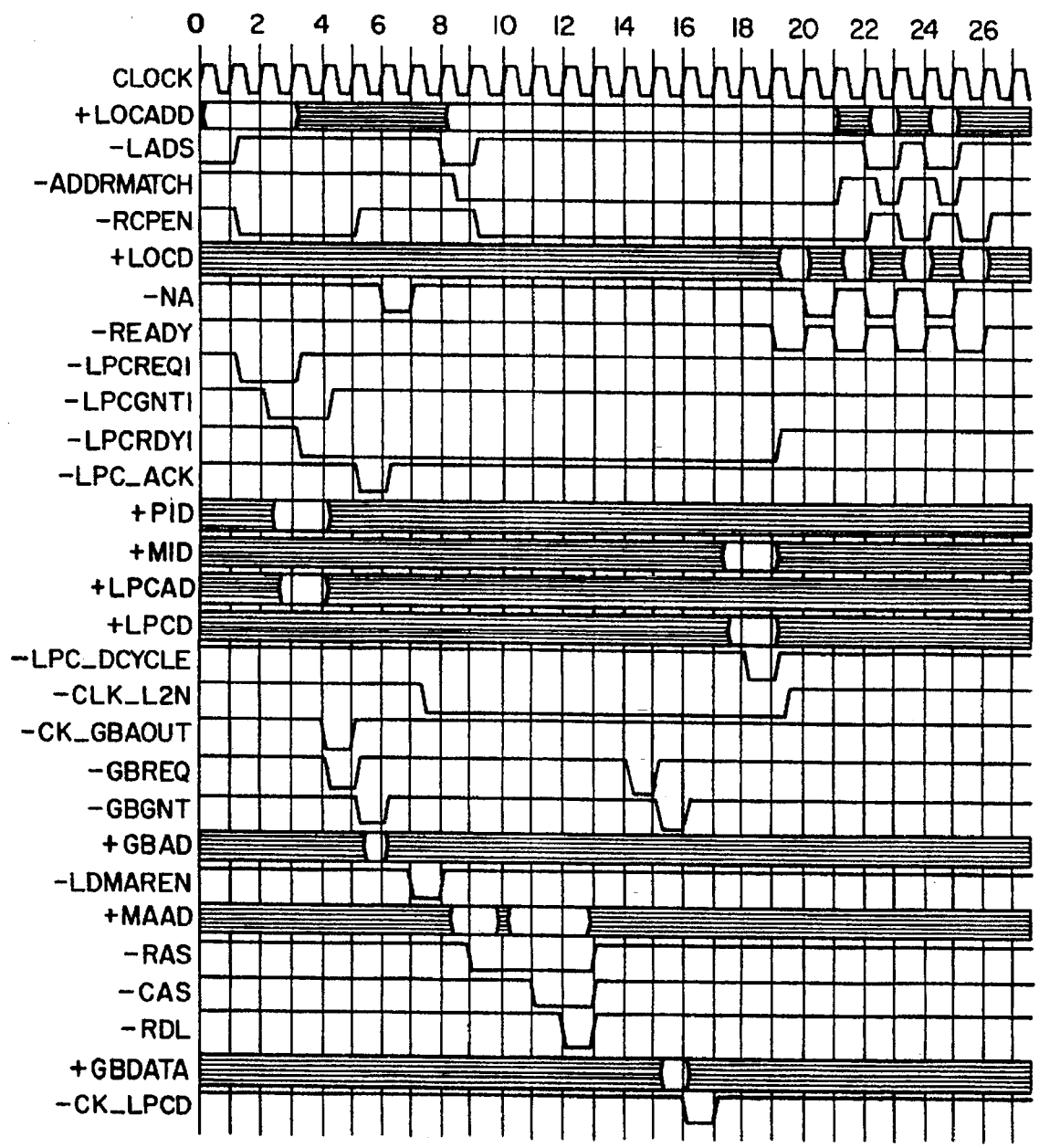
FIG. 8 is a timing diagram illustrating global memory read timing.

The global memory state machine 54 is optimized to support cache reloads, where consecutive words are loaded into the processor 22a. After the initial latency for the first Global Memory 26 read, all subsequent words are returned in two bus cycles. Various address comparison functions are performed within the EPBIF 22c with registers 90a and 90b and comparators 92a, 92b, 92c, and 94. Registers 90a and 90b maintain a record of the addresses of words that are currently stored in the external buffers 22e. If an out-of-sequence read is requested from the buffer 86 (i.e. the least significant 64-bits followed by the most significant 64-bits), an additional cycle is allowed for bus turnaround, and the read requires three cycles to complete. Reference is made to the timing diagrams for Global Memory 26 writes (FIG. 7) and reads (FIG. 8).

The contents of the read buffer 86 are invalidated if the processor 22a requests a word which is not currently cached, or if the currently cached word is detected as being written on the Global Bus 24. The EPBIF 22c snoops all bus cycles on the Global Bus 24 to determine if a write takes place to a location in Global Memory 26 which is currently encached within the associated read buffer 86. This snooping function is accomplished with comparator 94. In addition, some conditions result in an invalidation of the read buffer 86. For example, a read from the processor 22a, with LOCK active, invalidates the current contents of the read buffer 86, and the data is instead fetched from GM 26. Another signal line (LPC_NOCACHE) on the local bus 32 enables external devices to signal that they are returning non-cacheable data. Also, if a processor 22a writes the same address as is currently cached for reads, the read buffer 86 is invalidated. Furthermore, as a fail safe mechanism, the read buffer 86 may be automatically invalidated by the EPBIF 22c after 256 reads of the same encached data, without a read buffer 86 reload from Global Memory 26. This feature is controlled by a bit in the CSR 62. The combination of these features ensures that any data stored within the read buffer 86 remains consistent with the copy stored within Global Memory 26.

If data is returned from Global Memory 26 with an ECC (Error Check and Correction) error condition set, indicating that when the data was read the Global memory 26 detected an ECC error, the data is returned to the processor 22a, but is not cached in the read buffer 86, and an interrupt is generated by the EPBIF 22c to the processor 22a.

The write buffer 88 operates in a similar fashion. When the processor 22a writes a word to a Global Memory 26 location, it is cached in the write buffer 88. Any further writes within the same 256-bits are stored within the write buffer 88. The write buffer 88 circuitry includes a 32-bit register 88a for storing processor 22a byte enables, and updates these buffered write enables as appropriate. If the processor 22a writes to a location that is not currently cached in the write buffer 88 the contents of the write buffer 88 are flushed out to Global Memory 26, with the EPBIF 22c generating the appropriate control signals, and the newly written word replaces the old within the write buffer 88. In addition, a software-controllable mode enables the write buffer 88 to be written out to Global Memory 26 after all 32 bytes have been written by the associated processor 22a.

The write buffer 88 is also flushed if the processor 22a issues a locked write to Global Memory 26. A locked write is a special type of write cycle which the processor 22a may execute. During locked memory cycles, only the processor which initiated the lock is allowed to alter the data which it locked. This ensures consistency in multiprocessor systems, where many processors may attempt to share the same data. The processor 22a indicates a locked cycle by enabling a special output pin (LOCK) during the cycle. If a locked write is requested to Global Memory 26, this condition first flushes the present contents of the write buffer 88, so as to maintain order, and then writes the locked word without buffering it. This operation is similar to that previously described for locked reads. Also, as was previously stated, a read of a Global Memory 26 address which is currently buffered in the write buffer 88 causes the write buffer 88 to be flushed before the read request is issued. This ensures that if the copy of the data in the write buffer 88 is more current than that contained within the Global Memory 26, that the most current version is returned to the requesting processor.

An aspect of this invention is an enhancement referred to as an Atomic Fetch and Add for performing locked memory cycles, as is described in detail below.

The EPBIF 22c also implements timeout mechanisms for all shared bus accesses. In addition, in that the 32-bit local bus address corresponds to a 256-bit data address, the most significant five address bits are programmable, via a segment register 90c in the EPBIF 22c, to allow 128 Gbytes of Global Memory 26 to be addressed.

The EPBIF 22c also includes a feature whereby the write buffer may be explicitly flushed under software control by writing a single register (FLUSH 50b) within the EPBIF. In similar fashion, the read buffer may be explicitly invalidated by writing a second register (INVAL 50c).

In summary, data path performance to the GM 26 is improved, as stated above, by the provision of the 256-bit read buffer 86 and the 256-bit write buffer 88, both of which may be selectively enabled or disabled through bits in CSR 62. The buffers 86 and 88 provide bus-width matching between the processor 22a and the LPC bus 32, and also provide posting capability for writes, and increased throughput on pipelined reads. In the case of reads, the contents of the read buffer 86 are invalidated under the following circumstances: (a) a write on the GB 24 to the current read address (snoop match); (b) a GM 26 write request to the current read address; (c) a read to an address different than the current read address; (d) a volatile read (as indicated by +NOCACHE on the LPC bus 32); (e) a read from the processor 22a with the PCD bit set (and enabled in the CSR 62); and (f) autoflush after 256 reads from the same 32-byte address. As was noted above, the read buffer 86 may also be expressly invalidated by writing to the INVAL register 50c.

The read buffer 86 is not set as a result of a read request which fails to complete (e.g. timeout), or as a result of a read request which returns bad data (e.g. GM 26 parity or ECC error).

The contents of the write buffer 88 are flushed to the GM 26 under one of several conditions: (a) a condition indicated by the CSR 62 mode bit is met; (b) the performance of a locked write request, which flushes any data currently in the write buffer 88, and then performs the locked write to GM 26; and (c) a read to the address which is currently active in the write buffer 88. In this case the write buffer 88 is flushed before the read request is issued. As was noted above, the write buffer 88 may also be expressly flushed by writing to the FLUSH register 50b.

Write flush modes may be set under software control. If the above described CSR 62 bit is enabled, then the default mode for operation is to flush the write buffer 88 contents whenever the write buffer 88 contains valid data, and the processor 22a writes to a different address in the GM 26. In the second mode, the contents of the write buffer 88 are flushed whenever all 32 bytes of the 256 bit word have been written, as indicated by the byte enables. A register within the GM 26 state machine 54 latches the byte enables whenever a GM 26 write occurs, and when all 32 bits are set, generates a signal –BYTES_FULL, which causes a state machine 54 transition. This internal register is reset whenever the contents of the write buffer 88 are flushed.

The GM 26 state machine 54 also allows requests to go out onto the LPC bus 32 for other local devices. In this case, the GM 26 operation is initiated by an IO address decode rather than a GM 26 address decode by address decoder 84.

Buffers and Comparators

As well as providing the read buffer 86 and the write buffer 88 for the data path, the LPC bus 32 interface also provides the address buffers 90a and 90b. Buffer 90a stores the address of the current read buffer 86, and is enabled onto the LPC bus 32 during a read cycle. Buffer 90b stores the current write address. Two buffers are required so that if the processor 22a writes a 64-bit word, and then proceeds to read in a cache line before writing the rest of the 256 bits (and flushing the write buffer 88), the correct write address is driven to the LPC bus 32 during the write cycle.

Buffers 90a and 90b are implemented as 27-bit registers to store the GM 26 read buffer 86 and write buffer 88 addresses. These buffers are latched under the control of the GM 26 state machine 54. It is noted that the 27 most significant bits of the GB 24 address bus are driven on the 27 least significant bits of the LPC address bus. Just as the GB 24 address drives 29 address bits (three are ignored because of 64-bit addressing) so the EPBIF 22c drives 27 bits (five are ignored because of 256-bit addressing). The most significant five bits of the LPC address field are set, on all GM 26 (or IOSEL) operations, to a value which is stored in the segment register (SEGREG) 90c. This register is initialized to zero by a reset, and is subsequently written, if required, so as to address a larger GM 26 address space.

In addition, the latched addresses are used as inputs to several comparators. Comparators 92a and 92b compare the buffered read and write addresses, respectively, with the processor 22a address (bits 28-2). As a result, if the read buffer 86 contains the currently active read address, and the processor 22a issues a read request to the same page such that the address bits match, then comparator 92a asserts the signal R_MATCH, and the state machine 54 responds accordingly. A signal W_MATCH is similarly generated by comparator 92b. The third comparator 92c compares the latched read and write addresses. This comparison is performed at the same time as the previous two comparisons. A fourth comparator 94 compares the read address with the snoop address from the LPC bus 32. Finally, a fifth comparator (not shown) compares two bits of MID from the LPC bus 32 with the hardwired PROCID to the EPBIF 22c, so as to detect a data return that is directed to the EPBIF 22c.

It should be noted that, whenever the write buffer 88 is flushed, the contents of the register 88a storing the 32 byte enable signals for the LPC bus 32 is also cleared. Register 88a exists external to the EPBIF 22c to drive the LPC bus 32, and exists also as a "shadow" register within the EPBIF 22c. Eight-bit segments of register 88a are individually loaded, and the register 88a is cleared with one signal (UNSET_W_ACT). The stored byte enables, each of which corresponds to one byte in the write buffer 88, are combined to generate the signal LPC_RMW. This line is driven with the LPC bus 32 address on writes and is low if all of the byte enables are set. It is driven high if, for any word-aligned 32-bit slice, not all of the byte enables are set. As an example, if the processor 22a writes a 64-bit word, and all eight byte enables are active, then LPC_RMW is low, if this word is flushed. If two 64-bit words are written to the write buffer 88, and all 16 byte enables are active, then these two words would also be written with LPC RMW low. If a third word is written to the write buffer 88 and it is then flushed, and if either one of the 32-bit words within this third 64-bit word has an inactive byte enable, then LPC_RMW remains high when the write buffer 88 is flushed. This prevents the inadvertent overwriting of data in GM 26.

Interrupts:

The EPBIF 22c supports up to eight external, level-sensitive interrupts and eight internally generated interrupts. The interrupts are individually maskable through the interrupt mask register 64b, and individually clearable through the clear interrupt register 64c. Any active, non-masked interrupts are OR'd together and passed through to the single interrupt input pin of the processor 22a. The Memory Fault Address Register (MFAR) 64d stores the last three addresses accessed by the processor 22a, and in the event of a parity, ECC or bus error interrupt, enables the failing address to be read.

Whereas the eight external interrupts may be connected as required by the particular implementation, the following internal interrupts are currently implemented.

Timer/Counter Interrupt. This interrupt is set after the timer/counter 60a is initialized to a starting value and subsequently decrements to zero.

Bad Address. This interrupt is set when the EPBIF 22c receives a request from the processor 22a to an address which is not mapped.

Diagnostic Interrupt. This interrupt is set when the EPBIF 22c receives an interrupt packet over the serial diagnostic interface bus.

Buserror Interrupt. This interrupt is set when the EPBIF 22c times out while attempting to access the local bus 32.

End Of DMA Interrupt. This interrupt is set at the completion of a DMA operation.

In addition, two above-mentioned input pins (+LPC_ECCERR--I and +LPC_ERRTYPE--I) are used as interrupt inputs for indicating ECC errors returned with data read from Global Memory 26.

Inter-processor Interrupt (IPC) Support

The EPBIF 22c contains two registers 58 and 68 which support the sending of inter-processor interrupts. The IPC register 58 is differentiated into a Processor Select Mask register 58a and a GSI register 58b. The Processor Select Mask register 58a (FIG. 9) defines a destination mask and has a width of 32-bits, with each bit being associated with one of the system 10 processors. This enables a processor to send an interrupt to any one processor, or group of processors, within the system. An additional four bits stored within the GSI register 58b select a destination system unit, or the type of processor (computation or I/O). The second register is the Send Interrupt Register 68 (FIG. 4) which controls the dispatch of the interrupt. A processor may also interrupt itself via this mechanism.

The IPC interrupt is performed as a special local bus 32 cycle. Specifically, the EPBIF 22c sends an IPC interrupt message as a special read cycle that is differentiated from a normal read cycle by means of the LPC_ATYPE signal. This special local bus read cycle is passed through to the Global Bus 24 by the associated UBIF 34, and is decoded (FIG. 10) by the UBIF on any card which has its specific identifier set in the destination field. The LPC bus address lines, LPC_A(31:0), are used to convey the 32-bit processor 22a mask, and the length field, LPC_LEN (3:0), is used to convey the additional descriptor information. The UBIF 34 on any card which decodes a valid bit in the destination field generates the signal IPCINTR<3:0> to interrupt the relevant processor(s).

Figure 9:
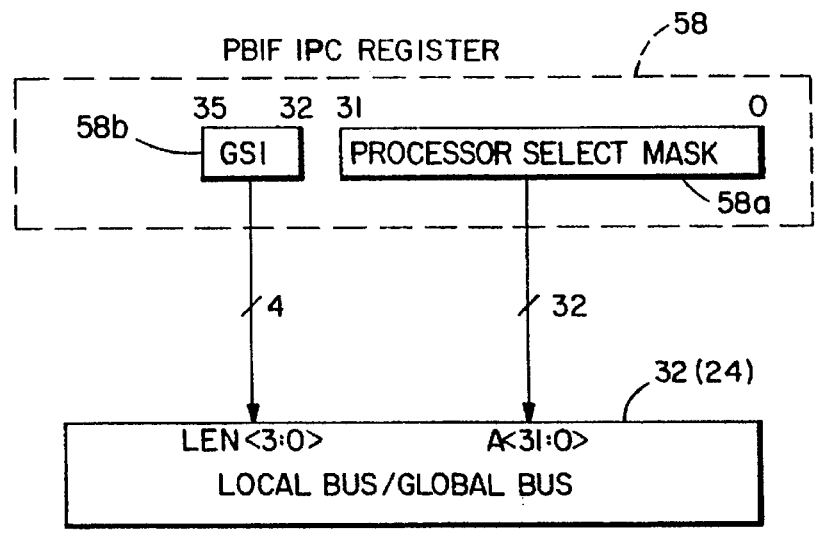
FIG. 9 shows an interprocessor communication register format and the coupling of the interprocessor communication register to the local bus/global bus.
Figure 10:
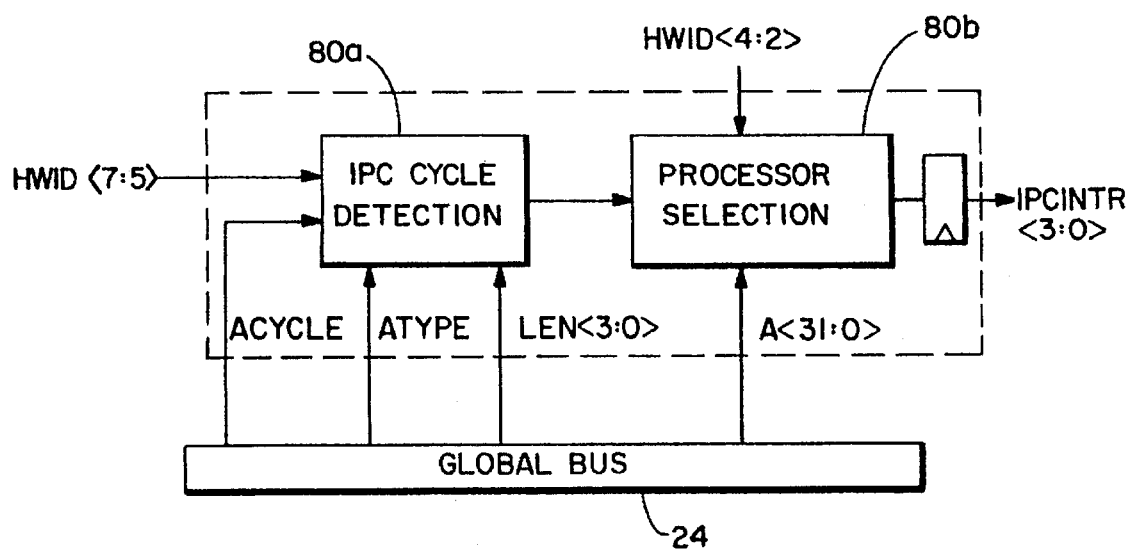
FIG. 10 is a block diagram depicting interprocessor communication logic, embodied within the global bus interface, that receives and decodes the interprocessor communication interrupt message that is generated by the logic of FIG. 9.

FIGS. 9 and 10 show in greater detail the operation of the IPC portion of the EPBIF 22c. Specifically, FIG. 9 shows the IPC register 58 format and the coupling of the IPC register 58 to the local bus 32 and to the global bus 24. FIG. 10 shows in greater detail the IPC logic 80, particularly an IPC cycle detection logic block 80a and an IPC processor selection logic block 80b.

DMA Functions

The EPBIF 22c supports Block DMA between the Global Memory 26 and the associated local memory 22b by means of the source address register 56a, the destination address register 56b, and the length/blocksize register 56c. In that the Global bus 24 supports block data transfers, both the size of the blocks to be transferred and the number of blocks are specified. Returned data blocks are stored in the UBIF 34 until requested by the EPBIF 22c. In a presently preferred UBIF 34 implementation, eight 256-bit words may be stored per processor 22a. From the UBIF 34 the DMA data is written into the Global Memory 26 read buffer 86, before being transferred to the local memory 22b data transceivers 22f and 22g 64-bits at a time. In operation, the DMA controller writes the local memory 22b at its full bandwidth, accommodates local memory 22b refresh during DMA operations, and also requests ahead on the local bus 32 for the next 256-bit word from Global Memory 26 so as to minimize any latency. The EPBIF 22c holds the processor 22a off the local bus 32 while DMA operations are taking place, and enables transfers to be achieved at up to 200 MBytes/second, assuming no contention on the Global Bus 24. An end of DMA interrupt signals completion of the operation.

Miscellaneous Functions

The Control and Status Register (CSR) 62 controls numerous functions within the EPBIF 22c, including setting a mode for the read buffer 86 and the write buffer 88 operation. The CSR 62 is a 32-bit register containing some bits which are read/write (r/w), some bits that are read-only (r/o), and other bits that are write-only (w/o). The CSR 62 bit definitions follow.

A (r/w) bit enables the write buffer 88 autoflush mode. When set to one, this bit allows the EPBIF 22c write buffer 88 to be automatically flushed out to Global Memory 26 when all 32 bytes have been written by the local processor 22a. When cleared to zero (default), the EPBIF 22c write buffer 88 is flushed only (a) when the associated processor's global write address is outside of the active 32-byte write block, (b) when the processor 22a issues a read to an address contained in the active 32-byte write block, or (c) when the processor 22a issues a LOCK write cycle to Global Memory 26.

A (r/w) bit enables read buffer 86 auto-invalidate mode. When set to one, this bit enables the EPBIF 22c read buffer 86 to be invalidated after 256 consecutive processor 22a reads to the same 32-byte Global Memory 26 address.

A (r/w) bit enables the read buffer 86. When set to one, this bit enables buffered reads from the EPBIF 22c read data buffer, which holds up to 32 consecutive bytes aligned on 32-byte global address boundaries. When cleared to zero (default), the EPBIF 22c reflects every processor 22a read to the global address space on the LPC bus and Global Bus 24. That is, all reads come from GM 26, and not from date previously stored in the read buffer 86.

A (r/w) bit enables the write buffer 88. When set to one, this bit enables processor writes to be buffered within the write data buffer 88, which holds up to 32 consecutive bytes aligned on 32-byte global address boundaries. When cleared to zero (default), the EPBIF 22c reflects every processor 22a write to the global address space on the LPC bus 32 and Global Bus 24, via the write buffer 88.

A (w/o) bit resets a fault condition. When a one is written to this bit location, the current fault condition is cleared and the memory fault address register 64d resumes latching Memory 26 addresses issued by the processor 22a. Whenever a fault condition occurs, the memory fault address register 64d reflects the physical address of the most recent memory reference which caused the error condition.

A (r/w) bit functions as a timer mode select. When set to one, the interrupt timer 60a continuously decrements from an initial value, generates a processor 22a interrupt, and resets to its initial value. When cleared to zero (default), the timer 60a decrements from its initial value, generates a processor 22a interrupt, and then ceases operation until reloaded by the processor 22a.

A (r/o) bit indicates the local memory 22b size as 0=16 MBytes or 1=32 MBytes.

Eight (r/o) bits are processor identifier bits. The resulting 8-bit code reflects the unique hardware identifier of the attached processor 22a, which is used to tag processor read requests to the Global Bus 24. The 8-bit code is composed of the 2-bit UNITID, which identifies SVS 10 system units in a closely coupled, multi-SVS configuration, the 4-bit SLOTID, which identifies the backplane slot to which the processor card 22 is connected, and the 2-bit LOC_PROCID, which uniquely identifies the processor 22a number on the processor card 22.

Four (r/o) bits reflect a revision level of the processor card 22.

A (r/w) bit functions as a processor boot bit. This bit controls whether the processor 22a will boot in 8-bit mode or in 64-bit mode following a reset. The default is the 64-bit mode.

A (r/w) bit specifies a Request (REQ) to Grant (GNT) timeout period. This bit controls if the EPBIF 22c will timeout if an LPC_REQ or LPC_WREQ does not receive an LPC_GNT within some predetermined number of cycles. The occurrence of a timeout with this bit enabled sets the BUSERR interrupt to the processor 22a.

Another (r/w) bit is a Read reply timeout bit and controls whether the EPBIF will timeout if it is waiting for data to be returned on the LPC bus 32 and does not receive an LPC_DCYCLE signal with an ID_MATCH within some predetermined number of cycles. The occurrence of a timeout with this bit enabled sets the BUSERR interrupt to the processor 22a.

A (r/w) bit is a PTB Enable bit which if low, causes the Global Memory state machine 54 to examine the processor 22a PCD/PWT signal lines on each memory request, and to not cache (read or write) the request if the PCD/PWT signal lines are active (high). If the PTB Enable bit is inactive, the state of the PCD/PWT signal lines are ignored.

A (r/w) bit functions as an ECC Enable bit. If this bit is inactive the EPBIF 22c ignores all incoming ECC errors. If this bit is active ECC errors generate interrupts and invalidate the Global Memory 26 read buffer 86 as appropriate.

A further (r/w) bit (Mode 40) functions, in accordance with an aspect of this invention, to cause additional timing states to be added into the global state machine 54 and the local memory state machine 52. The insertion of additional timing states relaxes the timing requirements when accessing LPC bus 32 and the GB 24. This aspect of the invention is described in detail below with reference to FIG. 13.

Serial Diagnostics Interface Bus

The EPBIF 22c implements a serial diagnostic bus, which enables a host computer to perform numerous control functions, or to access any part of memory which the local processor 22a can access. Thus, a serial bus master is enabled to read or write global or local memory or any of the registers within the EPBIF 22c. In addition, the serial bus master can halt, and subsequently continue, any processor, reboot a processor or a processor node, or send an interrupt to an individual processor or a group of processors. The serial bus thus "mimics" the operation of a processor and in this manner is capable of performing any operation which a processor can perform.

Atomic Fetch and Add Operation:

The PBIF described in the above referenced U.S. patent application Ser. No. 07/733,517, entitled "A Processor Buffered Interface for Multiprocessor Systems", D. Foster et al., now U.S. Pat. No. 5,410,654 implements the i8600XR processor lock protocol; that is, locked requests are echoed out to global memory 26, and individual words in global memory 26 are locked against access by other processors. This type of protocol (or some equivalent) is required in a multiprocessor system to ensure that data which is shared between processors is managed consistently. However, the processor 22a overhead attached to this protocol could be significant when, for example, all 32 processors are trying to obtain a lock on a single shared element in memory. That is, each of the processors must first read the location to determine if it is already locked, wait until the location is free (unlocked), issue a lock request, determine if the lock request is granted, and then proceed to modify the data.

Figure 11:
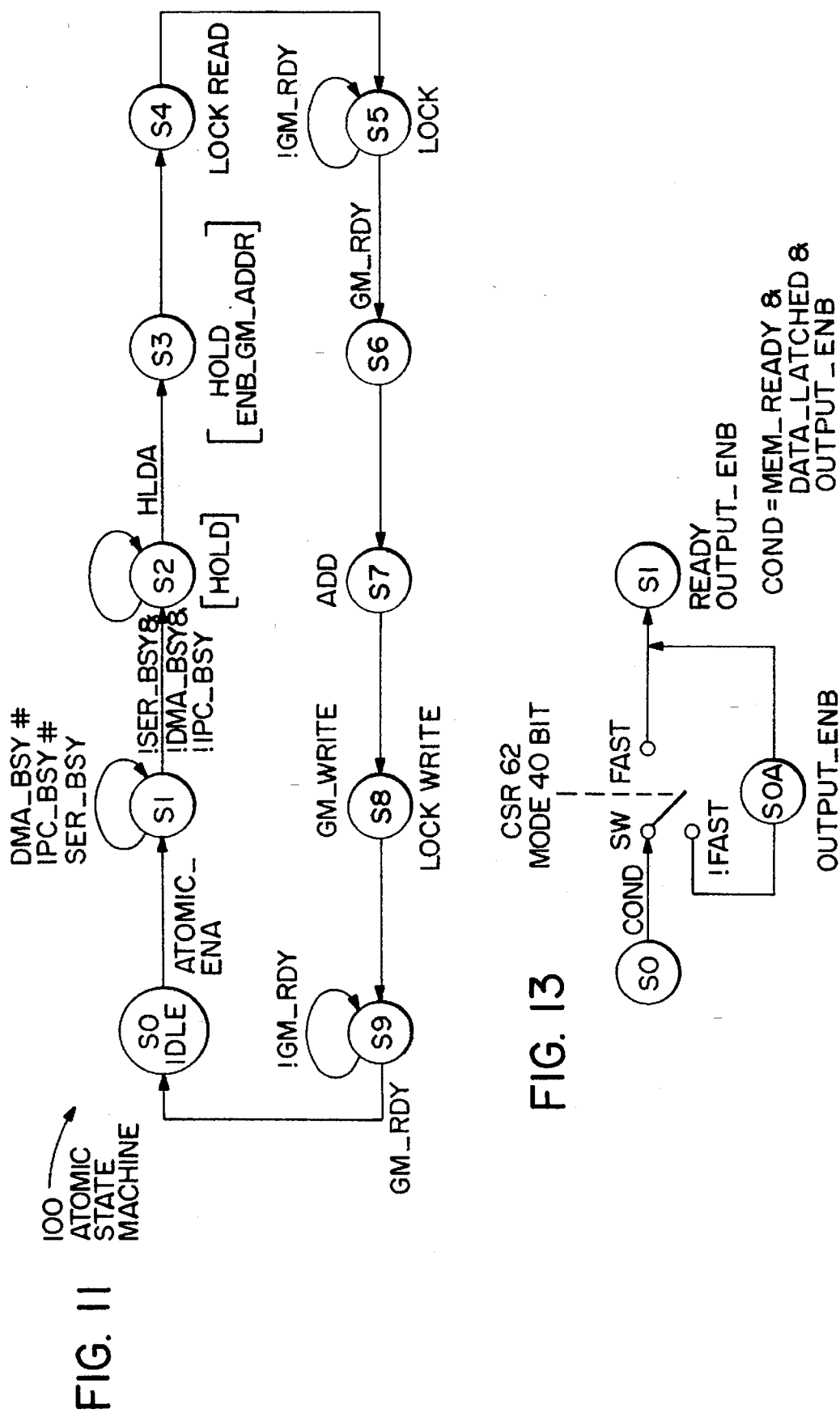
FIG. 11 is a state diagram that depicts the operation of an Atomic Fetch and Add state machine that is a feature of the invention.
Figure 12:
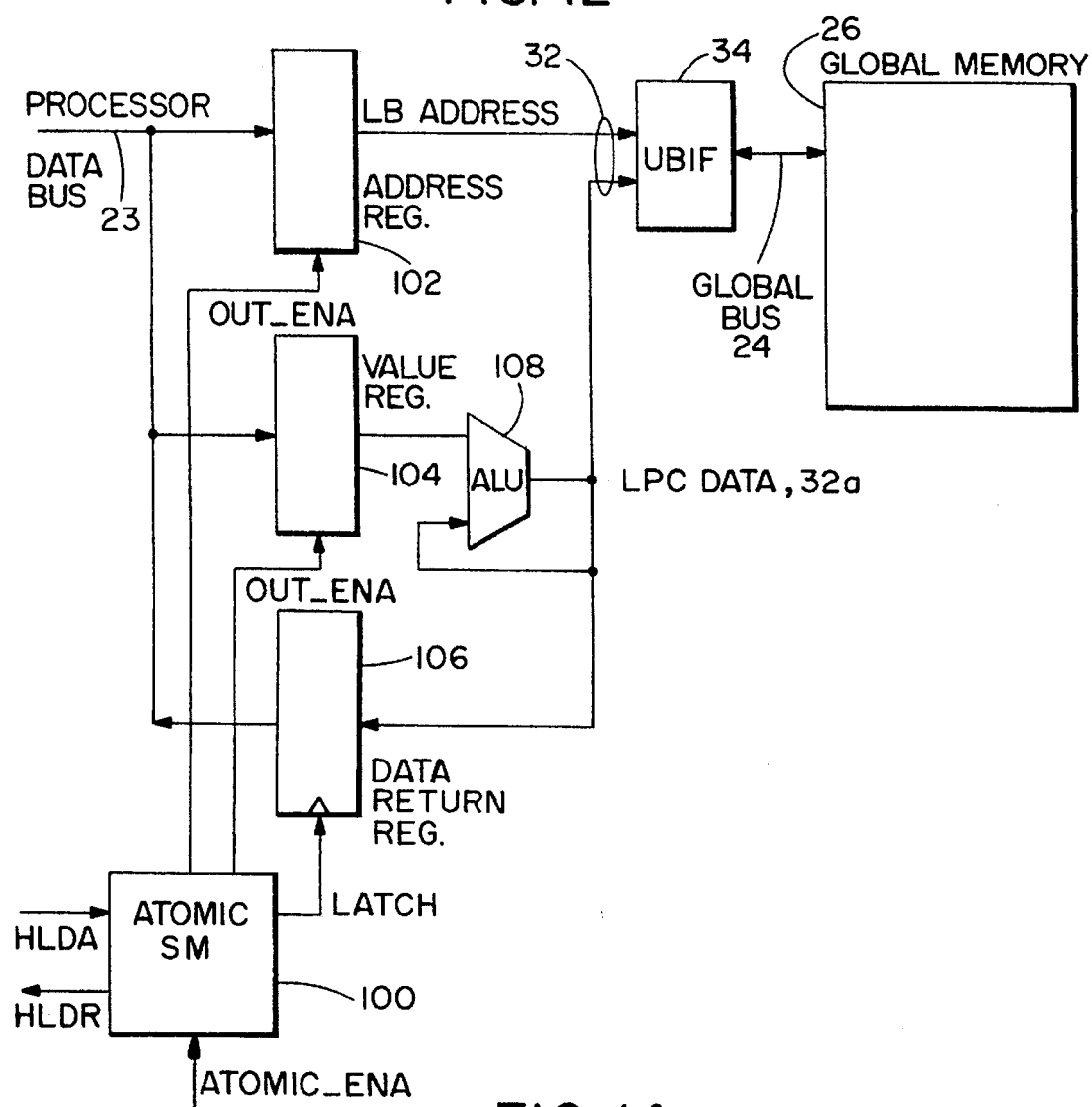
FIG. 12 illustrates the logic that implements the Atomic Fetch and Add function under control of the Atomic Fetch and Add state machine of FIG. 11.

The EPBIF 22c significantly reduces the processor 22a overhead by employing the Atomic Fetch and Add operation referred to above. Reference is now made to FIGS. 11 and 12 for describing the Atomic Fetch and Add (AFA) operation of the EPBIF 22c.

As seen in FIG. 12, the AFA circuitry includes an Atomic state machine 100 for controlling the operation of an address register 102, a value register 104, and a data return register 106. Registers 102 and 104 are writable by the processor 22a, and register 106 is readable by the processor 22a. The AFA circuitry also includes an incrementer/decrementer (ALU 108) having a first input coupled to the output of the value register 104 and a second input coupled to the LPC data bus 32a. The LPC data bus 32a is coupled, via the UBIF 34, to the GB 24 and the GM 26.

The operation of the Atomic state machine 100 is shown in the state diagram of FIG. 11.

In operation, the value register 104 is first written by the processor 22a with a value that corresponds to, preferably, the PROCID. Next, the processor 22a writes the address register 102 with an address in the GM 26. The action of writing the address register 102 generates a signal ATOMIC_ENA, which causes the Atomic state machine 100 to leave the Idle state (S0) and enter (S1). The state machine 100 remains in S1 until a condition is indicated wherein neither the serial interface, or the DMA, or the IPC is not (!) Busy (BSY).

A locked read request is then performed (States S1 to S4) to the specified address in GM 26. This request is held at the GM 26 if the addressed location is already locked by another processor, and is automatically retried until the location is free. More specifically, at S2 a HOLD request is issued to the processor 22a to gain access to the LPC bus 32. The Atomic state machine 100 remains in the S2 state until the HOLDA is received, indicating that the processor 22a has relinquished the LPC bus 32. At S3 the state machine 100 drives the content of the address register 102 to the LPC bus, and at S4 the locked read cycle to the GM 26 occurs.

When the locked location becomes unlocked, the data from the addressed memory location is returned from the GM 26 (S5), and the memory location is automatically locked by the GM 26. The returned data is stored in data return register 106 (S6). The returned data is also added by the ALU 108 to the content of the value register 104 (S7), and the result is automatically written out by the Atomic state machine 100 to the GM 26 (S8 and S9) using a locked write cycle, thereby unlocking the memory location. More particularly, at S8 the GM 26 write cycle is initiated, and the Atomic state machine 100 remains in S9 until the locked write is acknowledged (GM_RDY). The processor 22a may then read the content of the data return register 106, which reflects the original content of the memory location. If zero, the processor 22a is informed that it has obtained the lock. Furthermore, the processor 22a is assured that its PROCID is now stored in the addressed memory location, in that the content of the value register 104 was added to a data value of zero that was returned by the locked read. That is, if each processor writes its own PROCID into the memory location to lock the location, a memory location content of zero indicates that no processor had locked the location.

In the event of a processor not obtaining the lock (i.e. the content of the data return register 106 is greater than 0), then the content of the data return register 106 is written back out to the memory location by the processor 22a to restore the location to its original value. For the case where the processor 22a obtains the lock, as indicated by the content of the data return register 106 being zero, the processor 22a performs whatever operations are necessary using the shared resource or data, and then writes a zero to the location to indicate that it has relinquished ownership of the shared data or resource.

It can be seen that the Fetch and Add (read-modify-write) instruction occurs as an atomic operation from both the global memory 26 and the processor 22a point of view.

It should be realized that the address register 102 and the value register 104 could be embodied within a single register, for example a register that is 64-bits in width. In this embodiment, the processor 22a writes both the address and the value in one operation, instead of using two operations as described above. The single write operation is used to initiate the operation of the Atomic state machine 100, as described above.

Figure 15:
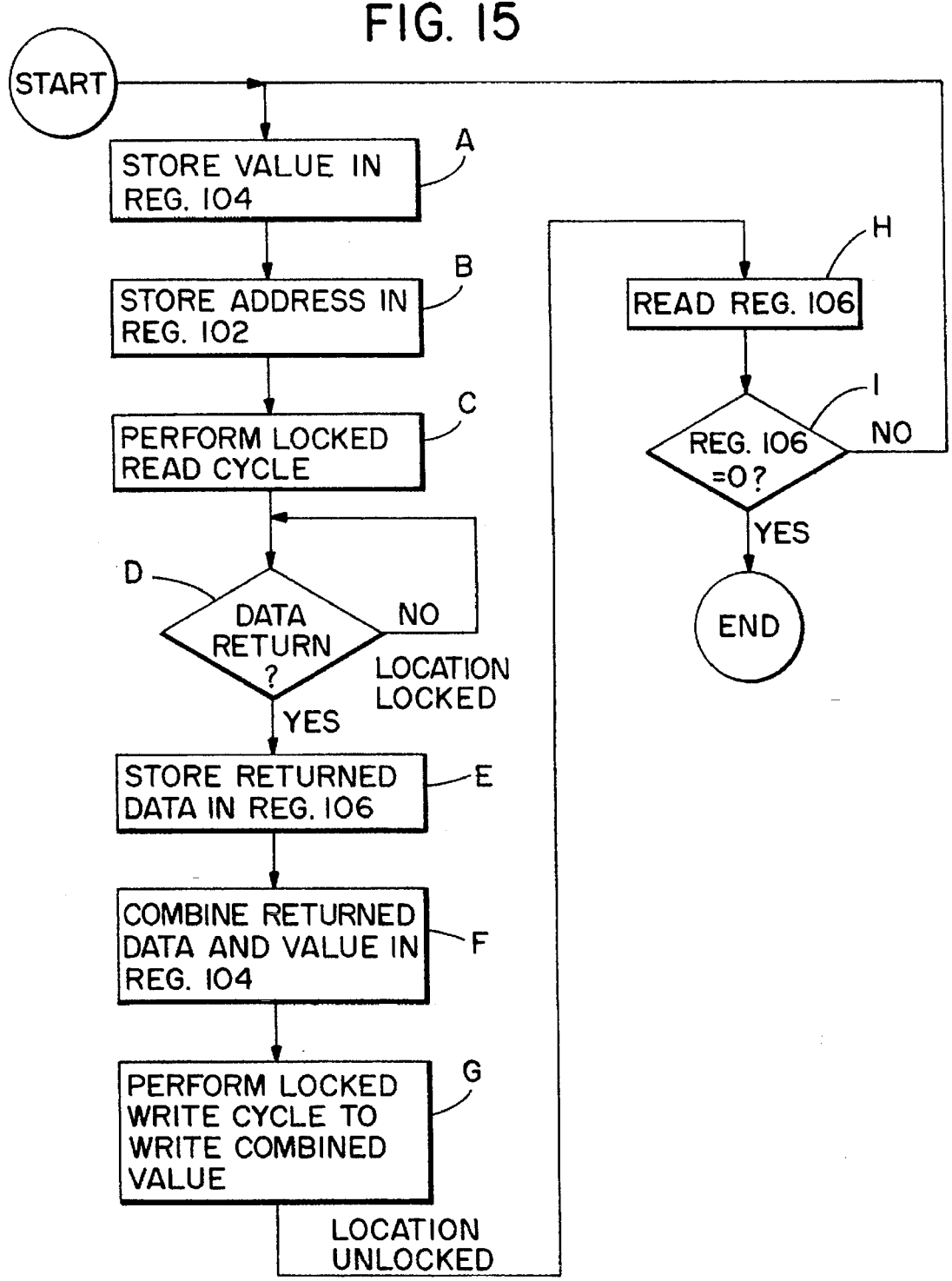
FIG. 15 is a flow diagram that illustrates a method of performing an Atomic Fetch and Add operation.

Based on the foregoing, and in accordance with the flow diagram of FIG. 15, it can be seen that this aspect of the invention provides a method for executing a locked memory read/write cycle with a first data processor. The method includes the steps of (A) storing, within a first register, a value to be written to a memory; and (B) storing, within a second register, an address of a location within the memory wherein the value is to be stored Responsive to the step of storing an address, (C) initiating a locked read cycle to a location within the memory that is specified by the address stored within the first register; (D) receiving the content of the addressed location from the memory; (E) storing the received content within a third register; (F) combining the content of the second register with the received content of the addressed location to produce a combined value; and (G) initiating a locked write cycle to the location within the memory that is specified by the address stored within the first register for storing the combined value into the location.

The step of receiving includes a step of locking the location within the memory against an access by a second data processor; and the step of initiating a locked write cycle includes a step of unlocking the location within the memory.

The step of initiating a locked read cycle includes the initial steps of generating a hold request signal to the first data processor; and receiving a hold acknowledge signal from the first data processor. The receipt of the hold acknowledge signal indicates that the first data processor has relinquished control of a bus that is coupled to the memory.

The method further includes the steps of (H) reading, with the data processor, the content of the third register means; (I) determining if the content of the third register indicates that the location has previously been written by a second data processor; and, if it is so indicated, executing steps (A) through (G) to restore to the location the content of the third register.

This technique imposes less overhead on the processor 22a, and also provides significantly less latency to obtain a lock when several processors are each contending for the locked location.

Selectable Wait States:

In accordance with an aspect of the invention, both the local memory state machine 52 and the global memory state machine 54 include programmable wait states. These are provided to accommodate increases in processor 22a clock frequencies, in that there may be some instances in which operation at a designed maximum frequency is not reliably possible due to, for example, the required speed grade of the memory devices is not available. For this reason, programmable wait states are included in those state machines that control the accessing of external devices, such as memory. The use of the programmable wait states is thus beneficial if memory devices having a required speed are not available, or if other system components, such as the backplane or the GM 26 are not capable of reliably functioning at the required maximum clock frequency. For this case, the processor 22a can still be run at the maximum clock frequency, for example 50 MHz, and wait states are enabled, via the CSR 62 Mode 40 bit. As a result, the local and global memory timing requirements are relaxed, while still operating the processor 22a at its maximum rated clock frequency. In this manner, the processor 22a runs at a faster rate out of its internal cache, and slower external memory is used, providing a performance increase over running the system at a lower overall clock speed.

As an example, FIG. 13 illustrates two state machine timing states S0 and S1. On the occurrence of a condition (COND), S0 transitions to S1. For this example COND= MEM_READY and DATA_LATCHED and OUTPUT_ ENB. The input of a selectable intermediate timing state (S0A) is shown logically connected through a switch (SW) to the output of S0. The CSR 62 MODE 40 bit operates the switch so as to either couple the output of S0 to the input of S1, for a FAST condition, or to couple the output of S0 to the input of S0A for a slow, or FAST condition. For the case where the device controlled by the state machine of FIG. 13 is not able to accept both the DATA_LATCHED and OUTPUT$_{13}$ ENB within a required time interval, the MODE 40 bit is set so as to cause the output of S0 to be connected to the input of S0A. As a result, a one clock cycle time delay is introduced between the execution of the OUTPUT_ENB by the S0A state and the transition to the S1 state from the S0A state, giving the external device additional time to respond.

In general, at least one of the selectively inserted wait states (S0A) is inserted between two state machine states wherein an external action may occur, such as between the states S3 and S4 of the Atomic state machine 100 of FIG. 11. If desired, more than one of the wait states S0A can be inserted, with additional control bits being employed to selectively enable them.

It can be appreciated that the use of this aspect of the invention facilitates factory and field diagnostic testing. The use of this aspect of the invention furthermore enables a system to be programmably set so as to continue operation in the event of an occurrence of a failure due to a memory device that is found not to reliably operate at its rated speed, while still operating the processor at its maximum clock rate.

Figure 14:
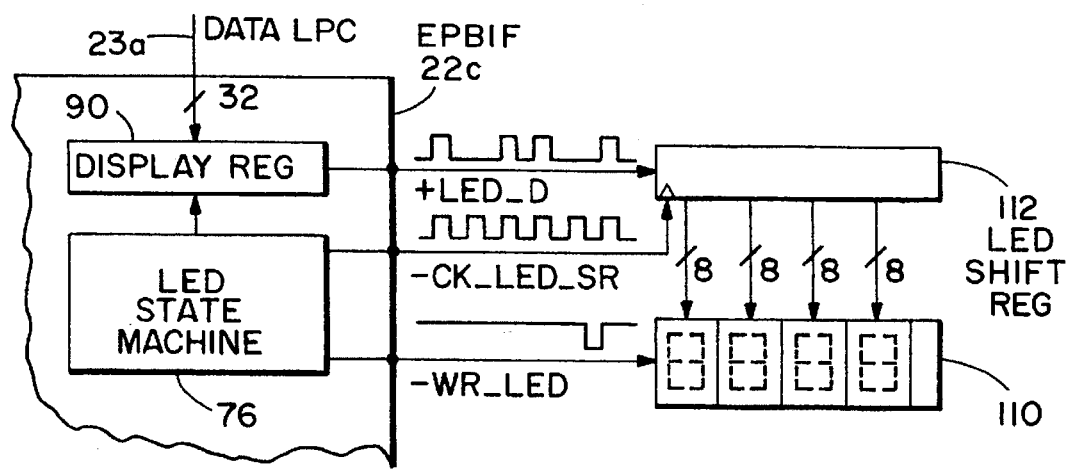
FIG. 14 illustrates a presently preferred LED interface.

LED Interface:

As seen in FIG. 14, the LED state machine 76 provides an interface for the processor 22a to control four intelligent alpha-numeric displays 110 which may be written for diagnostic purposes. A serial interface between the EPBIF 22c and the displays 110 is implemented to reduce the EPBIF 22c pin count. Writing to any display element is accomplished by first writing the Display Register 90. A 32 bit word is written into this register (8 bits per ASCII digit), and the LED state machine 76 then clocks out the data in turn to each character digit via a LED shift register 112. When the content of the Display Register 90 has been shifted into the LED shift register 112, the LED state machine 76 activates a second clock to clock down the content of the LED shift register 112 into the associated display elements.

Specifically, in response to the storage of data into the Display Register 90, the LED state machine 76 drives the content of the Display Register 90 to the +LED_D output pin while generating a clock on the –CK_LED_SR output pin. This action shifts the contents of the Display Register 90 to the LED shift register 112. The LED state machine then activates –WR_LED output pin to clock down the content of the LED shift register 112 into the associated display elements, thereby loading all of the display elements in parallel.

This is an enhancement over the PBIF described in the above referenced U.S. patent application Ser. No. 07/733, 517, entitled "A Processor Buffered Interface for Multiprocessor Systems", D. Foster et al., now U.S. Pat. No. 5,410, 654, wherein each display digit (and digit address) are individually written out to the LED display.

It should thus be realized that many of the functions implemented by the EPBIF 22c are useful in many types of data processing systems, particularly multiprocessor systems, such as the Atomic Fetch and Add operation and the use of state machines having system programmable wait states. In the presently preferred embodiment certain functions are optimized around the characteristics of the selected microprocessor device. Thus, in other embodiments of the invention variations in certain of the features may be made to accommodate the characteristics of the attached microprocessor.

Thus, while the invention has been particularly shown and described with respect to a preferred embodiment thereof, it will be understood by those skilled in the art that changes in form and details may be made therein without departing from the scope and spirit of the invention.

Having thus described my invention, what I claim as new, and desire to secure by Letters Patent is:

1. Interface apparatus for coupling to a microprocessor device, comprising:

input means for coupling to the microprocessor device for receiving address signal lines and control signal lines generated by the microprocessor device;

address decoding means, responsive to the received address signal lines, for determining if a microprocessor-generated memory access is directed to a private memory means, accessible only by the microprocessor device, or to a shared memory means that is accessible by the microprocessor device and by at least one other microprocessor device;

first output means, responsive to the address decoding means, for providing first address signal lines and first control signal lines to the private memory means in response to the microprocessor device generating a memory access to the private memory means;

second output means, responsive to the address decoding means, for providing second address signal lines and second control signal lines for coupling to the shared memory means in response to the microprocessor device generating a memory access to the shared memory means, and control register means having bits that are settable by said microprocessor device, wherein said first output means includes means, responsive to a state of at least one of the bits of said control register means, for selectively inserting zero, one or more wait timing states while providing the first address signal lines and the first control signal lines when accessing said private memory means; and wherein said second output means includes means, responsive to a state of at least one of the bits of said control register means, for selectively inserting zero, one or more wait timing states while providing the second address signal lines and the second control signal lines when accessing said shared memory means.

2. Interface apparatus as set forth in claim 1 and further comprising:

a data bus that is coupled between said microprocessor device, said interface apparatus, and said private memory means;

wherein said private memory means includes a plurality of interleaved memory banks, each of said memory banks being coupled to said data bus through an associated bidirectional data buffer means, and wherein each of said memory banks is coupled to said first address signal lines through an associated address buffer means; and data storage means coupled to the data bus for buffering data read from the shared memory means by the microprocessor device and for buffering data written to the shared memory means by the microprocessor device.

3. In a multiprocessor data processing system having a plurality of data processors individual ones of which have an associated private read/write memory accessible over a private bus, the system further having a shared memory that is accessible by each of the plurality of data processors over a shared bus, interface apparatus for each of the plurality of data processors, the interface apparatus for each data processor comprising:

input circuitry coupled to address signals and control signals generated by said data processor;

address decoding means, responsive to received address signals, for determining whether a memory access initiated by the data processor is directed to said private memory or to said shared memory;

first output circuitry, responsive to the address decoding means, for outputting first address signals and first control signals to said private bus in response to said data processor generating a memory access to said private memory;

second output circuitry, responsive to the address decoding means, for outputting second address signals and second control signals to said shared bus in response to said data processor generating a memory access to said shared memory; and a control register having a plurality of bits that are settable and resettable by said data processor, wherein said first output circuitry is comprised of a first state machine means having an input coupled to at least one of said bits of said control register for selecting a number of wait timing states to be used when outputting said first address signals and said first control signals when accessing said private memory; and wherein said second output circuitry is comprised of a second state machine means having an input coupled to at least one of said bits of said control register for selecting a number of wait timing states to be used when outputting said second address signals and said second control signals when accessing said shared memory.

* * * * *